US012097824B2

United States Patent
Meador et al.

(10) Patent No.: US 12,097,824 B2
(45) Date of Patent: Sep. 24, 2024

(54) SLIDER MECHANISM FOR DELIVERY CONTAINER

(71) Applicant: GM Cruise Holdings LLC, San Francisco, CA (US)

(72) Inventors: Timothy Jon Meador, Fairfield, CA (US); Alexis DeStasio, San Francisco, CA (US); Andrew W. Clavijo, Hayward, CA (US); Jordan Hale Factor, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 378 days.

(21) Appl. No.: 17/539,000

(22) Filed: Nov. 30, 2021

(65) Prior Publication Data

US 2023/0115047 A1  Apr. 13, 2023

Related U.S. Application Data

(60) Provisional application No. 63/250,702, filed on Sep. 30, 2021.

(51) Int. Cl.
*B60R 7/08* (2006.01)
*B60R 5/00* (2006.01)
*B60R 5/04* (2006.01)
*B60R 7/04* (2006.01)

(52) U.S. Cl.
CPC ............ *B60R 7/08* (2013.01); *B60R 5/003* (2013.01); *B60R 5/041* (2013.01); *B60R 7/04* (2013.01)

(58) Field of Classification Search
CPC ......... B60P 1/6436; B60P 1/6409; B60P 1/64; B60P 1/6418; B60R 7/043; B60R 7/04; B60R 7/08; B60R 5/041; B60R 5/003
USPC ............................................ 414/522; 206/758
See application file for complete search history.

(56) References Cited

U.S. PATENT DOCUMENTS

| 2,751,099 | A | * | 6/1956 | Johnson | B60P 1/6436 |
| | | | | | 414/522 |
| 3,092,428 | A | * | 6/1963 | Kerschner | B25H 3/02 |
| | | | | | 312/289 |
| 5,634,577 | A | | 6/1997 | Pearson et al. | |
| 5,709,008 | A | | 1/1998 | Dickinson | |
| 6,325,439 | B1 | | 12/2001 | Crossman | |
| 8,757,458 | B2 | * | 6/2014 | Nebel | B60R 11/06 |
| | | | | | 224/42.32 |
| 2002/0005649 | A1 | * | 1/2002 | Hofmann | B60N 2/305 |
| | | | | | 297/188.1 |
| 2019/0168678 | A1 | * | 6/2019 | Magnuson | B60R 7/08 |
| 2019/0176711 | A1 | * | 6/2019 | Simmons | B60N 2/206 |

* cited by examiner

*Primary Examiner* — Glenn F Myers

(57) ABSTRACT

A delivery container is designed to fit into the rear passenger compartment of a vehicle, such as an autonomous vehicle (AV) that makes deliveries without a human driver. The delivery container has a drawer that can move from one side of the delivery container near a first rear door to the other side of the delivery near the opposite rear door. A single load of items can be accessed from the same side of the AV, or two different loads may be accessed from the same side. The drawer can automatically or manually move items from one side of the vehicle to the other.

16 Claims, 18 Drawing Sheets

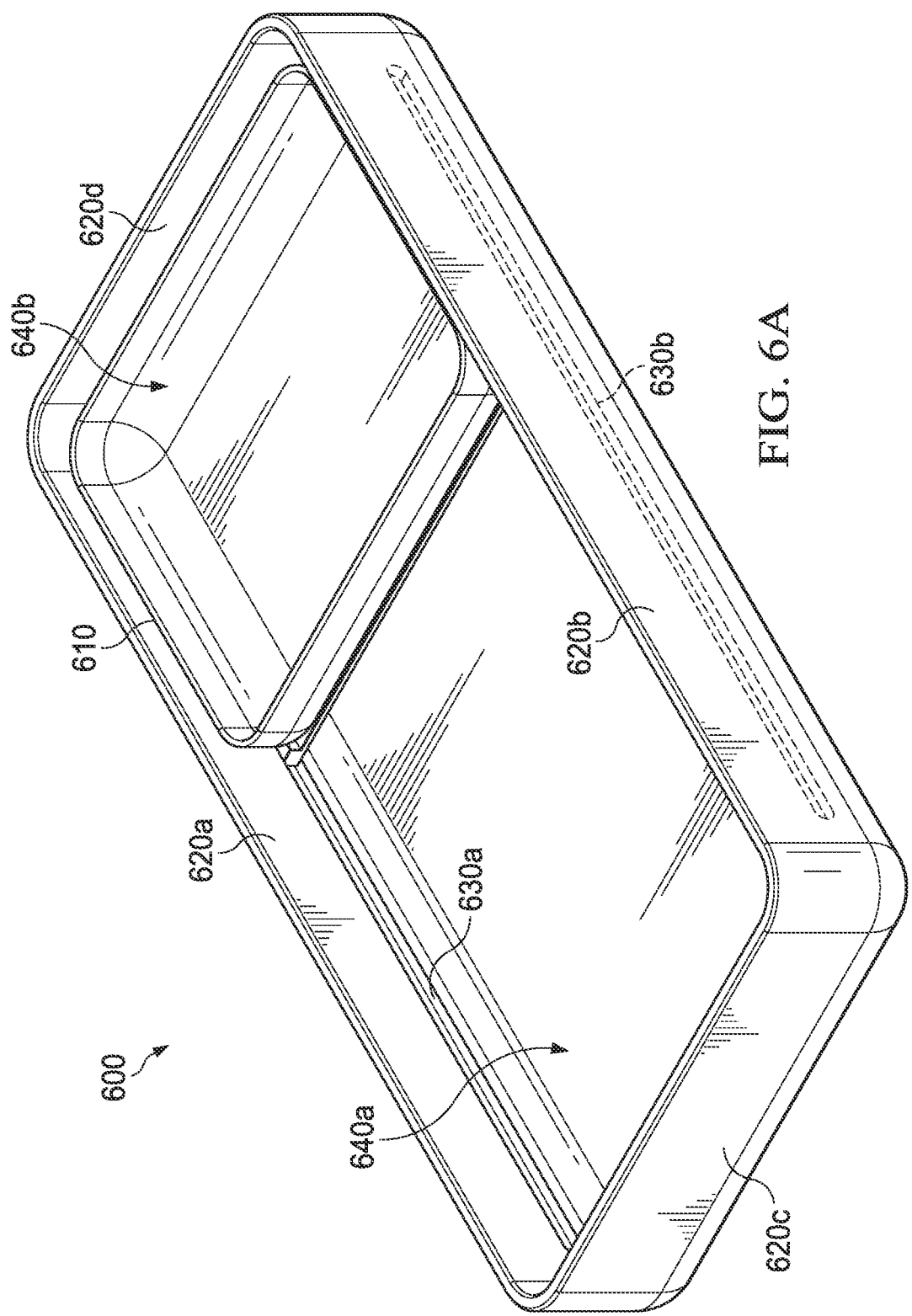

SLIDER MECHANISM FOR DELIVERY CONTAINER

CROSS REFERENCE TO RELATED APPLICATION

This application claims the benefit of and priority to U.S. Provisional Application No. 63/250,702, filed Sep. 30, 2021, the disclosure of which is hereby incorporated by reference herein in its entirety for all purposes.

TECHNICAL FIELD OF THE DISCLOSURE

The present disclosure relates generally to delivery vehicles and, more specifically, to a delivery container for storing delivery loads within a vehicle.

BACKGROUND

In a conventional delivery context, a delivery driver drives a vehicle with items for delivery to recipients, and the driver removes the items for delivery and hand-delivers the items to their recipients. For example, a grocery delivery service may employ people to shop for a customer's groceries, load the groceries into a car, drive the groceries to a delivery address, and deliver the groceries from the car to the customer's doorstep.

Autonomous vehicles (AVs) can be used to deliver various items, such as groceries, to recipients. However, when an AV is used for delivery, there is nobody to assist the recipient with finding the recipient's items. Existing AVs for grocery delivery have built-in compartments that can store different loads for different customers. However, such AVs are specifically designed for grocery delivery, and the AVs cannot be repurposed for other applications, such as ride-sharing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6a is a perspective view of a delivery container base with a drawer mounted to a track, according to some embodiments of the present disclosure;

DESCRIPTION OF EXAMPLE EMBODIMENTS OF THE DISCLOSURE

Overview

Figure 1:
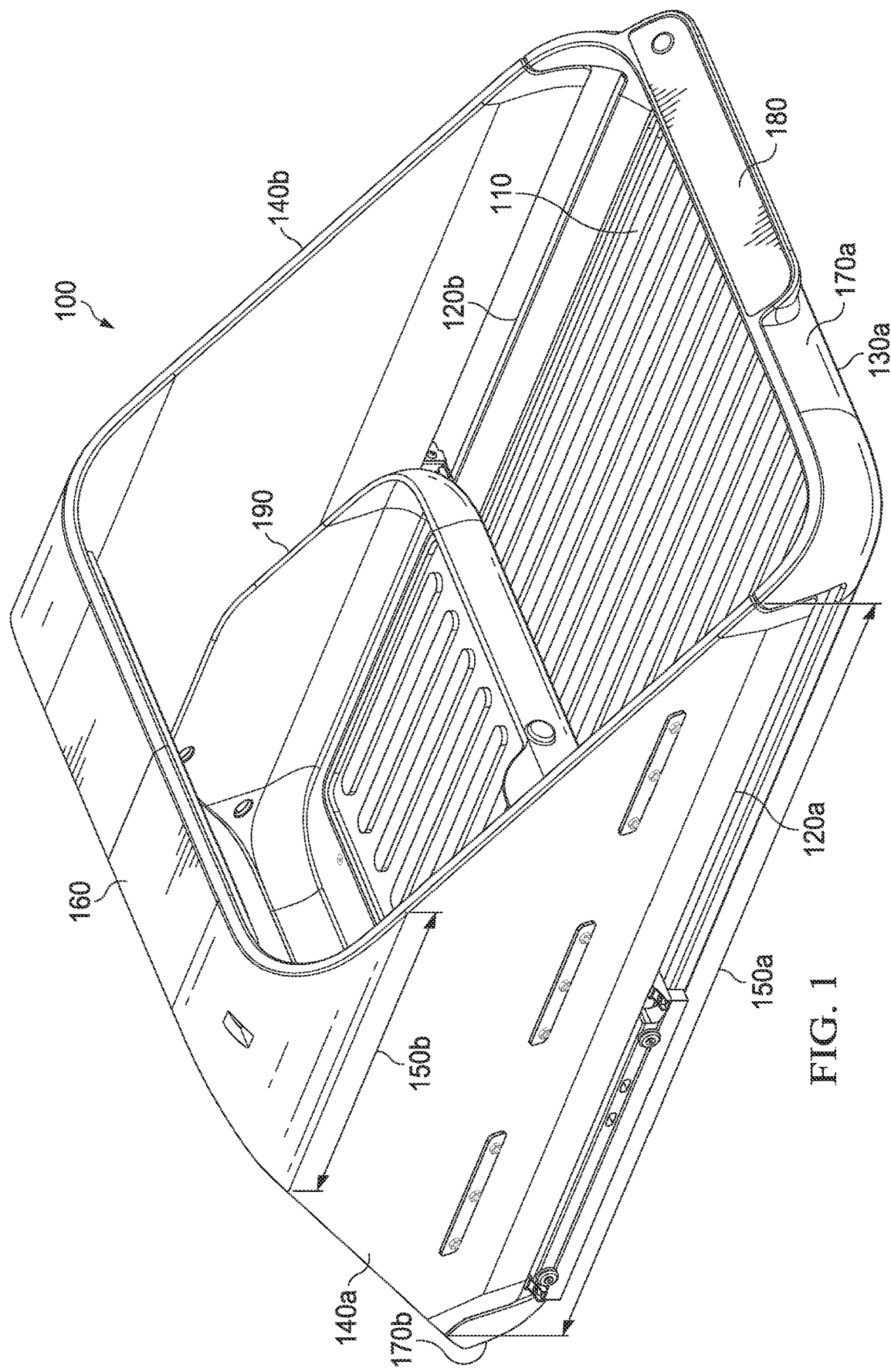
FIG. 1 is a front perspective view of a delivery container, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Delivery vehicles often carry loads for multiple recipients simultaneously. For example, a vehicle used to delivery groceries receives multiple loads of groceries at a grocery store, and the vehicle drops off the loads of groceries to their respective recipients without returning to the grocery store between deliveries. When the vehicle is operated by a human driver, the driver typically ensures that each recipient receives the correct grocery load. However, when an AV is used to delivery groceries, there is no human operator to ensure that the grocery loads go to the correct recipients.

As disclosed herein, a delivery container is sized and shaped to fit across the rear passenger compartment of an AV. The delivery container is designed to enable recipients to easily retrieve their delivery items. Several factors are considered when designing a delivery container suitable for use in the rear passenger compartment of an AV used for delivery. When the AV arrives at a delivery location, a recipient retrieves their items without assistance. The recipient should be able to easily see and identify their delivery items, and the recipient should be able to retrieve the items without difficulty, e.g., without excessive reaching or straining. In addition, the delivery container should adequately protect the delivery items, e.g., keeping items secure in the delivery container during transport to the recipient. For a grocery recipient, the delivery container should be large enough to transport a full load of groceries, and enable the storage of bulky or unusually shaped items, such as paper towels, toilet paper, large boxes, etc.

Design considerations from the point of view of the delivery operator include ease of loading the items and ease of cleaning the delivery container. For example, the delivery operator prefers a delivery container that can be easily cleaned between delivery loads. In some cases, if the delivery operator may switch an AV between different types of assignments (e.g., the AV is sometimes used to delivery groceries, and at other times used to provide a ride service), it is useful for the delivery container to be easily installed and uninstalled. If the delivery service delivers loads that take up less than the full size of the container, in addition to providing an overall large capacity, it is useful for the delivery container to include a divider to divide the container into different sections for different loads.

Furthermore, it is advantageous for a full load of delivery items to be accessed from one side (typically the right side) of the vehicle. In many cases, a delivery vehicle pulls over along the right side of a street, and it is preferable for a recipient to access the delivery items from the right side of the vehicle, e.g., from the sidewalk. Requiring the user to go around the AV to the opposite, street-side of the vehicle is less convenient, and oncoming traffic may pose a risk to a user. While the right side is often preferred, in some cases, the user may prefer to access the delivery from the left side of the vehicle, e.g., if the delivery vehicle pulls over to the left side of a one-way street, or if the delivery vehicle pulls into a recipient's driveway. Therefore, it can be advantageous for a delivery container to enable a user to access items from either side of the AV.

As described herein and shown in the figures, a delivery container includes a sliding mechanism, e.g., a drawer or tray (generally referred to herein as a drawer), that moves items from one side of the delivery container to the other, e.g., from the left side of the vehicle towards the right side of the vehicle, or vice versa. The delivery container extends across the rear passenger area of the AV, which may be, e.g., 40 to 70 inches wide. While a user can easily access items close to the door from which they are accessing the delivery container, if a large load includes items spread across the full delivery container, it is cumbersome to reach across the delivery container. Thus, the drawer can move delivery items from the far side of the delivery container closer to the recipient, after the recipient has removed the closer items. Furthermore, if the AV has multiple recipients, the drawer can move a load for the second recipient from one side of the delivery container to the other, e.g., so that both the first recipient and the second recipient can retrieve their items from the right side of the AV. In addition to assisting with delivery, the drawer can also assist a person loading items into the delivery container. For example, the loader can move the drawer to the front of the container, place a first load of delivery items on the drawer, move the drawer to the back of the container, and then place a second load of delivery items on the base of the delivery container.

In some embodiments, a divider can separate two compartments in the delivery container, so that it is apparent to the first recipient which items are theirs. If the delivery container contains two loads, after the first recipient retrieves their items, the divider is released, and the drawer can move the second load from one side of the delivery container to the other.

Embodiments of the present disclosure provide a delivery system including a delivery container having a first side, a second side opposite the first side, a third side extending between the first side and the second side, and a fourth side opposite the third side and extending between the first side and the second side, the third side accessible from a left vehicle door, and the fourth side accessible from a right vehicle door; a first track extending along at least a portion of the first side; a second track extending along at least a portion of the second side; and a moveable drawer coupled to the first track and the second track, the moveable drawer to move from a first region of the delivery container proximate to the left vehicle door to a second region of the delivery container proximate to the right vehicle door.

Further embodiments of the present disclosure provide a delivery system including a delivery container having a base; a first side; a second side opposite the first side; a third side extending between the first side and the second side; a fourth side opposite the third side and extending between the first side and the second side; a top extending between the first side and the second side; a first region bounded by a first portion of the base, a first portion of the first side, a first portion of the second side, and the third side; and a second region bounded by a second portion of the base, a second portion of the first side, a second portion of the second side, and the fourth side; the delivery system further including a first track extending along at least a portion of the first side; a second track extending along at least a portion of the second side; and a moveable drawer coupled to the first track and the second track, the moveable drawer to move from the first region of the delivery container to the second region of the delivery container.

Still other embodiments of the present disclosure provide a delivery system including a delivery container having a first region accessible from a left vehicle door, and a second region accessible from a right vehicle door; a first track extending across the first region and the second region; a second track extending across the first region and the second region, the second track on an opposite side of the delivery container from the first track; a drawer coupled to the first track and the second track; and a leadscrew coupled to the first track and the drawer, the leadscrew to automatically move the drawer along the first track and the second track from the first region of the delivery container to the second region of the delivery container.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example Delivery Containers

Figure 2:
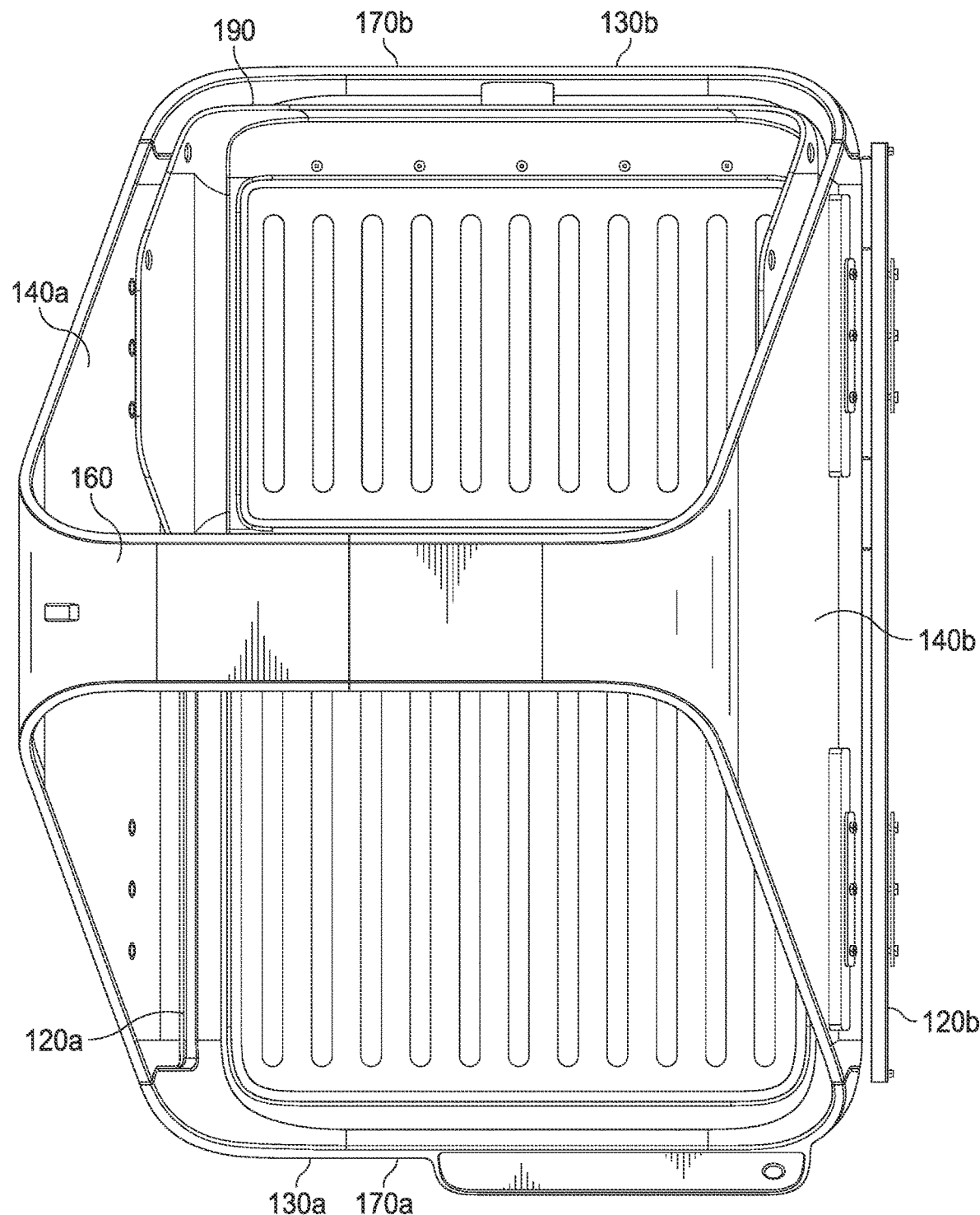
FIG. 2 is a top view of the delivery container, according to some embodiments of the present disclosure.

FIGS. 1 and 2 show a front perspective view and a top view of a delivery container 100, according to some embodiments of the present disclosure. The delivery container 100 includes a base 110 with two long edges 120 and two short edges 130, two sides 140 extending upward from the long edges 120, and a top 160 extending between the two sides 140. FIGS. 1 and 2 both illustrate a first long edge 120a and a second long edge 120b; the second long edge 120b is on the opposite side of the base 110 from the first long edge 120a. FIG. 1 illustrates a first short edge 130a, and FIG. 2 illustrates the first short edge 130a and a second short edge 130b, where the second short edge 130b is on the opposite side of the base 110 from the first short edge 130a. The short edges 130 extend between the long edges 120a and 120b, and the long edges 120 extend between the short edges 130a and 130b. The length of the long edges 120 is greater than the length of the short edges 130.

The sides 140 have a width that decreases moving from the base 110 towards the top 160. In this example, the sides 140 are roughly trapezoidal. Two widths 150a and 150b on the first side 140a are illustrated in FIG. 1, where the first width 150a, near the base 110 of the delivery container 100, is larger than the second width 150b, near the top 160 of the delivery container 100. The second side 140b may have the same or similar widths 150 at the corresponding heights along the second side 140b. In other embodiments, the sides 140 may have different shapes; e.g., the sides 140 may have one wider, rectangular portion near the base 110, and a narrower rectangular portion near the top 160, with a small transition region between these two portions. In some embodiments, the sides 140 may have a larger surface area than shown in FIGS. 1 and 2; this may reduce visibility into the delivery container but provide more structure and security for the items in the delivery container.

The top 160 is positioned opposite the base 110 and covers a portion of the delivery container 100. The top 160 has a smaller surface area than the base 110. In other embodiments, the top 160 may have a larger or smaller area than shown in FIGS. 1 and 2. In some embodiments, the delivery container 100 may not include a top 160, but instead, is open at the top.

Figure 5:
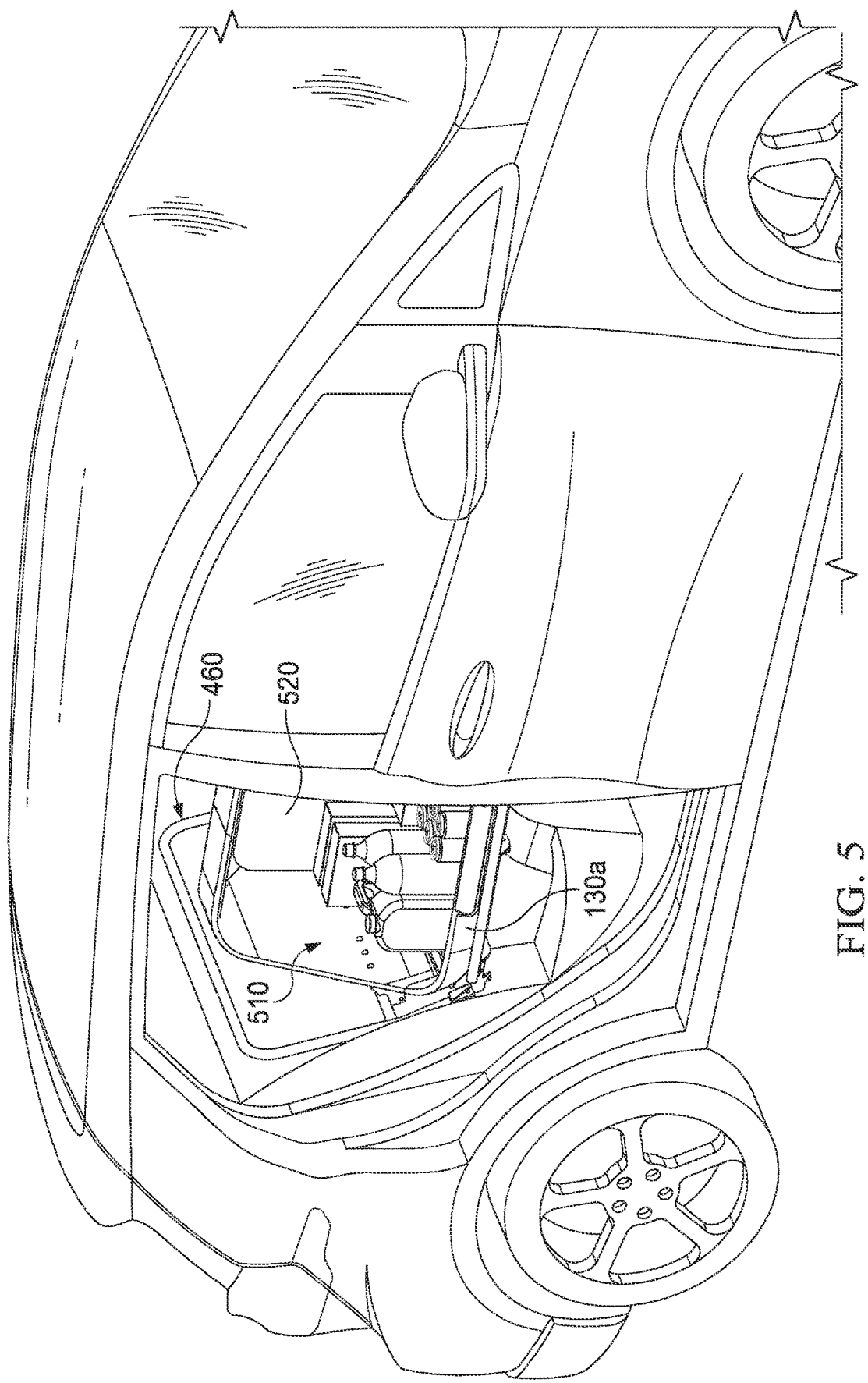
FIG. 5 is a view of an AV with a delivery container mounted in the back passenger cabin, according to some embodiments of the present disclosure.

The delivery container 100 is configured to fit in the rear passenger cabin of a vehicle, i.e., the part of the vehicle that typically includes back seats. The back seats may be removed to fit the delivery container 100, or the delivery container 100 may be installed over the back seats. When the delivery container 100 is mounted in a vehicle, the long edges 120 extend across the width of the back passenger cabin (e.g., from near the left back door to near the right back door), and the short edges 130 extend at least partially along the length of the back passenger cabin. More specifically, the first long edge 120a is located proximate to the back of the rear passenger cabin, and the second long edge 120b is located nearer to the front of the rear passenger cabin. The first short edge 130a is located proximate to the right door to the rear passenger cabin, and the second short edge 130b is located proximate to the left door to the rear passenger cabin. An example image of a delivery container in an AV is shown in FIG. 5, described below.

The delivery container 100 further includes a first lip 170a and a second lip 170b that extend upward from the base 110 from the first short edge 130a and the second short edge 130b, respectively. The lips 170 define the short ends of the delivery container 100 and prevent items in the delivery container 100 from slipping out of the delivery container 100 during transport. The lips 170 may extend upward from the base 110 for, e.g., 0.5 to 8 inches, and are curved outward from the short edges 130. As shown in FIGS. 1 and 2, the corners of the container are curved, e.g., FIG. 2 shows that the corners of the base 110 (e.g., between the edges 130 and 120) are rounded. Similarly, the joints between the long edges 120 and the sides 140 are rounded, as are the joints between the sides 140 and the top 160.

The first lip 170a includes a user interface (UI) panel 180. The UI panel 180 may include a screen providing information and/or instructions to a user. In some embodiments, the second lip 170b includes a second UI panel similar to the UI panel 180; the second UI panel may be used by a user accessing the delivery container 100 from the opposite side of the vehicle. The UI panel 180 may additionally or alternatively include one or more buttons, e.g., a button to change a position of a drawer 190 inside the delivery container 100, or a button to actuate a divider between two compartments of the delivery container. The drawer 190 may slide from one side of the delivery container 100 to the other side, enabling a recipient to access a load of items on the drawer 190 from either side of the delivery container 100. Example configurations of the drawer 190 are described further below.

Figure 3:
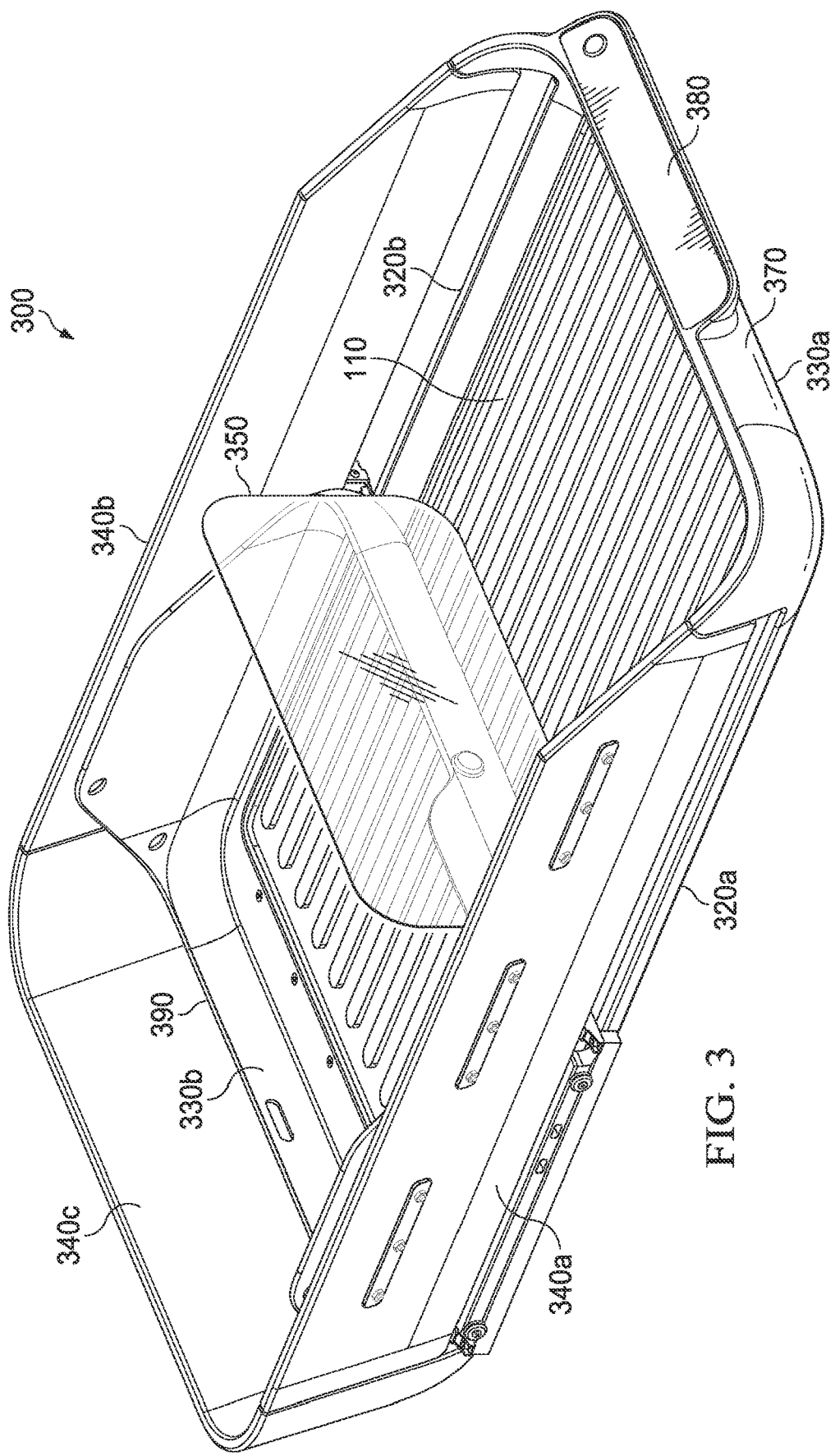
FIG. 3 is a front perspective view of an alternate configuration of a delivery container, according to some embodiments of the present disclosure.

FIG. 3 is a front perspective view of an alternate configuration of a delivery container, according to some embodiments of the present disclosure. Unlike the delivery container 100 shown in FIG. 1, the delivery container 300 shown in FIG. 3 does not have a top. The delivery container 300 includes a base 310 with two long edges 320 and two short edges 330; the base 310, long edges 320, and short edges 330 are similar to the base 110, long edges 120, and short edges 130 of FIGS. 1 and 2. The delivery container 300 includes a first side 340a extending up from the first long edge 320a, a second side 340b extending up from the second long edge 320b, and a third side 340c extending up from the second short edge 330b. Each of the sides 340 has approximately the same height, e.g., between 2 and 12 inches. The first and second sides 340a and 340b do not extend as high up or have the same shape as the first and second sides 140a and 140b. The delivery container 300 has a lip 370 with an integrated UI panel 380, which may be similar to the first lip 170a with UI panel 180 shown in FIGS. 1 and 2. In some embodiments, the third side 340c may be replaced by a second lip similar to the lip 370; the second lip may or may not have a second UI panel similar to the UI panel 380. If the third side 340c is replaced by a lip, the shapes of the first and second sides 340a and 340b may be adjusted so that they are symmetric from the side view, i.e., so that the top edges of the sides 340a and 340b angle downwards towards the second lip near the second short edge 330b.

The delivery container 300 further includes a divider 350 and a drawer 390. The divider 350 is positioned in front of the drawer 390 in the orientation shown in FIG. 3, and the divider 350 may divide a load of items in front of the divider 350 from a load of items behind the divider 350 and on the drawer 390. The divider 350 can flip downwards over the base 310, and the drawer 390 can move along a track to move items on the drawer towards the first short edge 330a. Example configurations of the drawer and divider are described further below.

Figure 4:
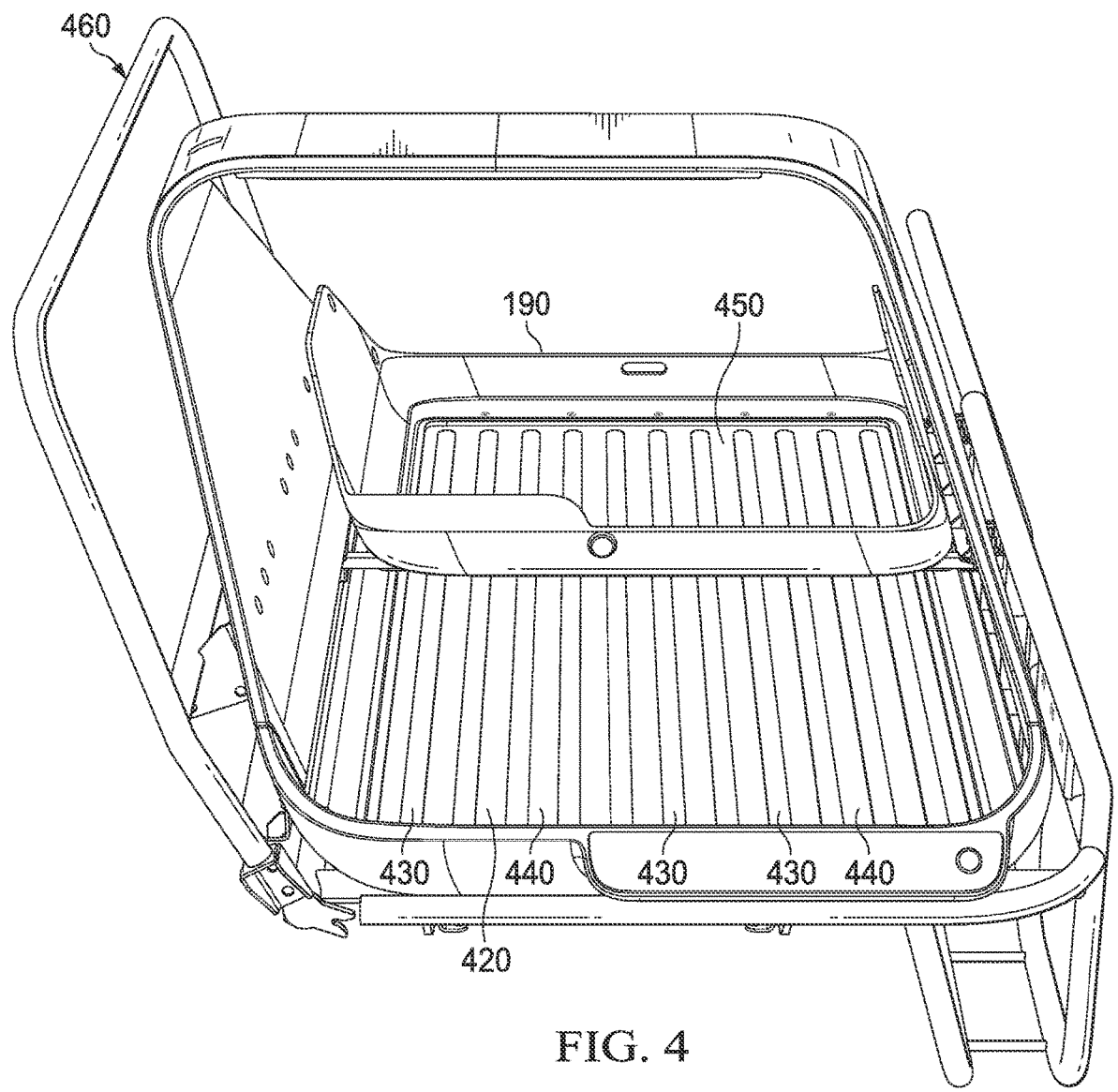
FIG. 4 is a front perspective view of a delivery container with a drawer, the delivery container mounted in a structural frame, according to some embodiments of the present disclosure.

FIG. 4 is a front perspective view of a delivery container with a drawer, the delivery container mounted in a structural frame, according to some embodiments of the present disclosure. While FIG. 4 shows a delivery container having the design of the delivery container 100, the features discussed below may apply to other delivery container designs, e.g., the delivery container 300.

A base tray or drip tray 420 is installed over a base, e.g., the base 110 or the base 310. The drip tray 420 has alternating ridges 430 and grooves 440. If items (e.g., grocery items or other food delivery items) placed in the delivery container have any liquid spillage or condensation, the liquids flow into the grooves 440, while the ridges 430 elevate the items above the grooves 440 and above any liquids in the grooves 440. The drip tray 420 may be easily cleaned (e.g., wiped with a soft cloth). The drip tray 420 may also be easy to remove, so that an operator can remove and clean the drip tray 420, or remove and replace the drip tray 420 if it becomes heavily stained or damaged. The ridges 430 may also prevent items from sliding during transport across the base of the delivery container.

FIG. 4 also shows a drawer 410 mounted in one portion of the delivery container. The drawer 410 is positioned in a back portion of the delivery container (in the orientation of FIG. 4), and the drawer 410 can move along a track, e.g., to move from the back portion to the front portion of the delivery container. Thus, if items are placed on the drawer 410, they can be moved to either side of the delivery container and accessed from either the right rear door or the left rear door. The drawer 410 further includes a drawer drip tray 450, which is similar to the base drip tray 420.

FIG. 4 also illustrates a structural frame 460. The delivery container attaches to the structural frame 460 at various attachment points, such as bolt holes located in a base below the base drip tray 420, which correspond to bolt holes in the structural frame 460. The structural frame 460 is configured to be securely mounted in the rear passenger cabin of the vehicle. For example, the structural frame 460 can be coupled to various attachment points in the rear passenger compartment of the vehicle (e.g., LATCH anchor hardware in the vehicle's rear passenger compartment, cushion grommets, and/or seatback strikers), and the delivery container attaches to the structural frame 460 to secure the delivery container within the vehicle.

FIG. 5 is a view of an AV with a delivery container mounted in the rear passenger cabin, according to some embodiments of the present disclosure. FIG. 5 illustrates how a delivery container, e.g., the delivery container 100, fits into the rear passenger cabin of a vehicle and is mounted to the structural frame 460. In this view, a first compartment 510 that includes the first short edge 130a can be accessed from the open AV door, which is the right rear door of the AV. The delivery container has a divider 520 which separates the first compartment 510 from a second compartment located behind the divider 520 and proximate to the left rear door.

Example Drawer Slider Mechanisms

FIG. 6a is a perspective view of a delivery container 600 with a drawer 610 mounted to a track 630, according to some embodiments of the present disclosure. The delivery container 600 includes four sides 620. The first side 620a and second side 620b are two long sides on opposite sides of the delivery container 600, and the third side 620c and the fourth side 620d are two short sides (i.e., shorter than the long sides 620a and 620b) on opposite sides of the delivery container 600. The first and second sides 620a and 620b extend between the third and fourth sides 620c and 620d, and the third and fourth sides 620c and 620d extend between the first and second sides 620a and 620b. The third side 630c may be accessible from one vehicle door (e.g., the left rear vehicle door), while the fourth side is accessible from the opposite door (e.g., the right rear vehicle door). While the four sides 620 are depicted as having a uniform height, the drawer 610 and track 630 may be incorporated into any design of delivery container, such as the delivery containers 100 or 300 described above. For example, instead of the first and second sides 620a and 620b depicted in FIG. 6a, the delivery container 600 may have taller sides shaped like the sides 140a and 140b, and a top 160 extending between the two taller sides.

A first track 630a is mounted to the first side 620a and extends along at least a portion of the first side 620a. A second track 630b is mounted to the second side 620b and extends along at least a portion of the second side 620b. The lengths of the tracks 630 enable to the drawer 610 to move across the full length of the delivery container 600, i.e., from a position with one edge of the drawer 610 near or abutting the third side 620c, to a position with the opposite edge of the drawer 610 near or abutting the fourth side 620d. The delivery container 600 may have two compartments or regions 640a and 640b. The first region 640a of the delivery container 600 is bounded by the third side 620c, a first portion of the first side 620a, and a first portion of the second side 620b; the second region 640b of the delivery container 600 is bounded by the fourth side 620d, a second portion of the first side 620a, and a second portion of the second side 620b. The track 630 enables the drawer 610 to move from the second region 640b, where it is shown in FIG. 6a, to the first region 640a. Thus, the drawer 610 can move from a position proximate to the left vehicle door to a position proximate to the right vehicle door, and vice versa.

Figure 6B:
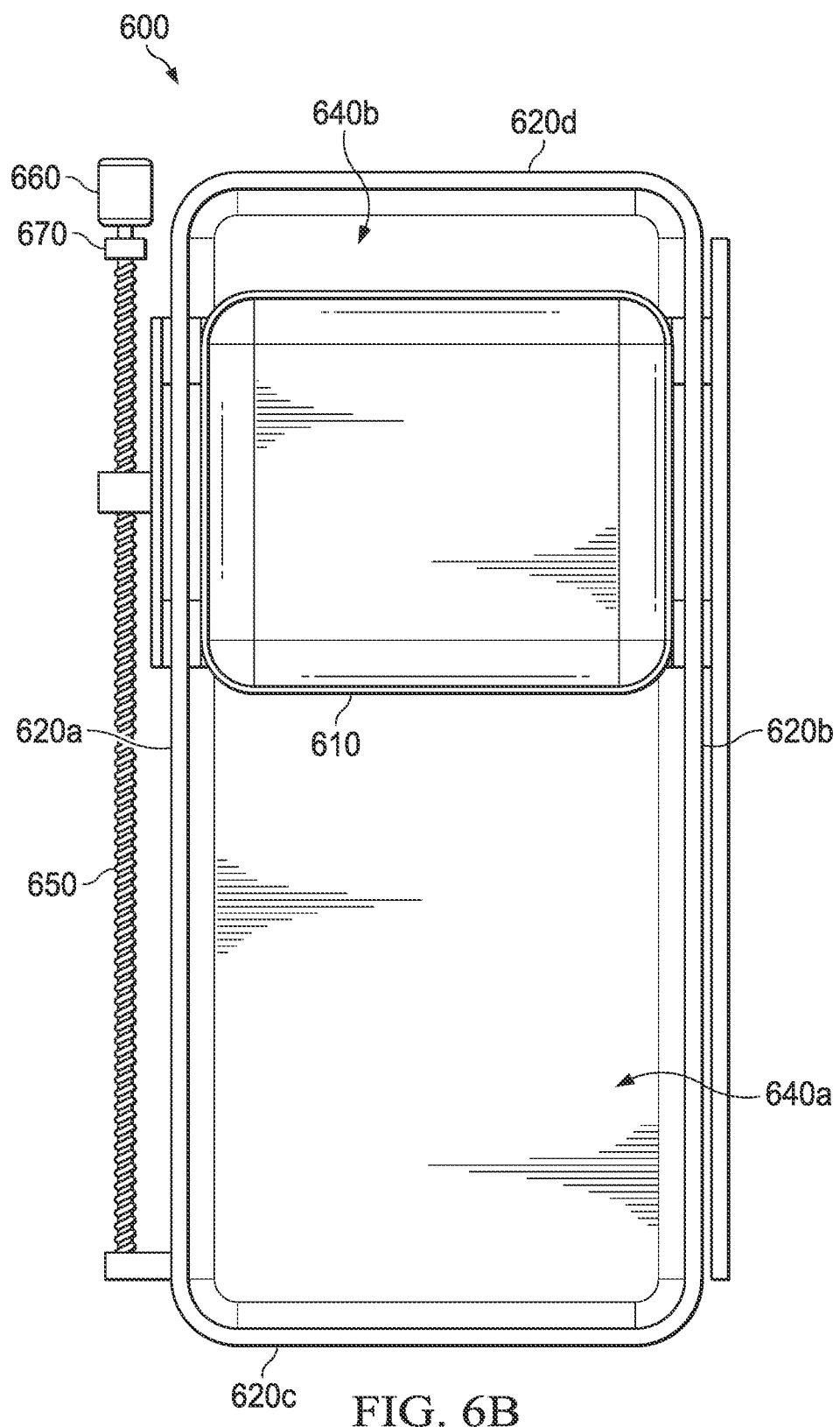
FIG. 6b is a top view of the delivery container base of FIG. 6a, showing a leadscrew to move the drawer, according to some embodiments of the present disclosure.

In some embodiments, one or both of the tracks 630 include a mechanism for automatically moving the drawer 610, e.g., a leadscrew on one of the tracks (e.g., track 630a). FIG. 6b is a top view of the delivery container base of FIG. 6a, showing a leadscrew 650 to move the drawer 610. The leadscrew 650 may be controlled by a control motor, e.g., a control motor in the control motor case 660 coupled to the leadscrew 650. The control motor can be controlled by a controller of the delivery container 600 or a controller in the AV that is coupled to the delivery container 600. For example, a processor with hardware and/or software for controlling the control motor may be housed behind the UI panel 180 or 380. As another example, the processor and motor controller may be located in a rear footwell of the AV. A battery for powering the processor and/or other electronic components of the delivery container may also be located in the footwell, e.g., the motor controller and processor are on one side of the footwell, and the battery is on the other side of the footwell.

The controller and control motor can cause the leadscrew 650 to automatically move the drawer 610 along the pair of tracks 630a and 630b from one region (e.g., 640b) of the delivery container 600 to the other (e.g., 640a). For example, after a first delivery load is fully removed from the delivery container 600, as detected by a weight sensor and/or cameras, the controller can instruct the control motor to cause the leadscrew 650 to move the drawer 610 to the other side of the delivery container (e.g., from the region 640b to the region 640a) so that a second recipient is able to access their delivery items from the right rear door of the AV. As another example, if a user opens a door proximate to one region (e.g., 640a) and sees their items on the opposite side of the delivery container 600 (e.g., in the region 640b), the user can press a button on the UI panel 180 to instruct the control motor to automatically move the drawer 610 towards the user. The leadscrew 650 may be able to move the drawer 610 in both directions, e.g., to also move the drawer 610 from the first region 640a back to the second region 640b.

In some embodiments, the drawer can alternatively or additionally be moved manually. For example, if a user is retrieving a large load with items both on and off the drawer 610, after the user removes the closer items that are not on the drawer, the user can manually pull the drawer 610 towards themselves. In some embodiments, the control mechanism for automatically moving the drawer (e.g., the leadscrew) has a clutch 670. The clutch 670 disengages the leadscrew 650 in response to a user manually moving the drawer. Thus, the clutch 670 overrides the automatic motion of the drawer 610.

Figure 7A:
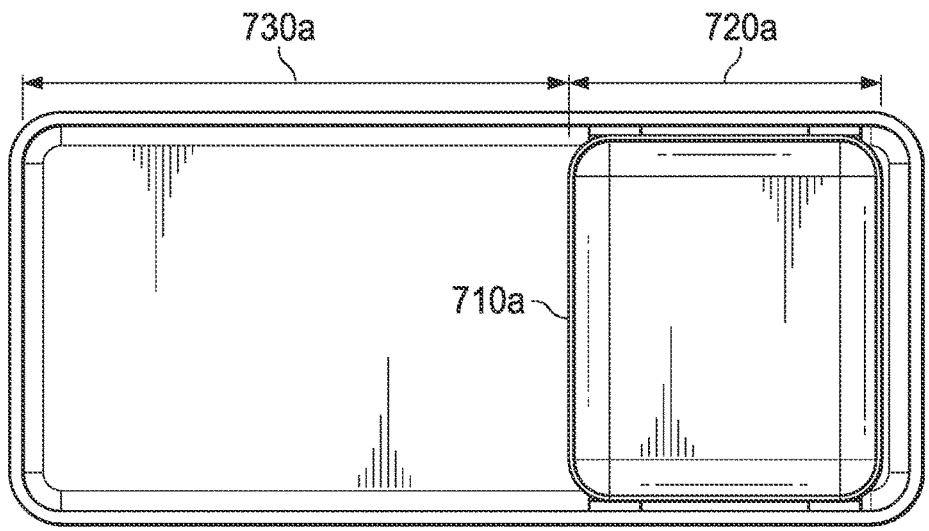
FIGS. 7a, 7b, and 7c are top views of a delivery container with drawers of different sizes, according to some embodiments of the present disclosure.
Figure 7B:
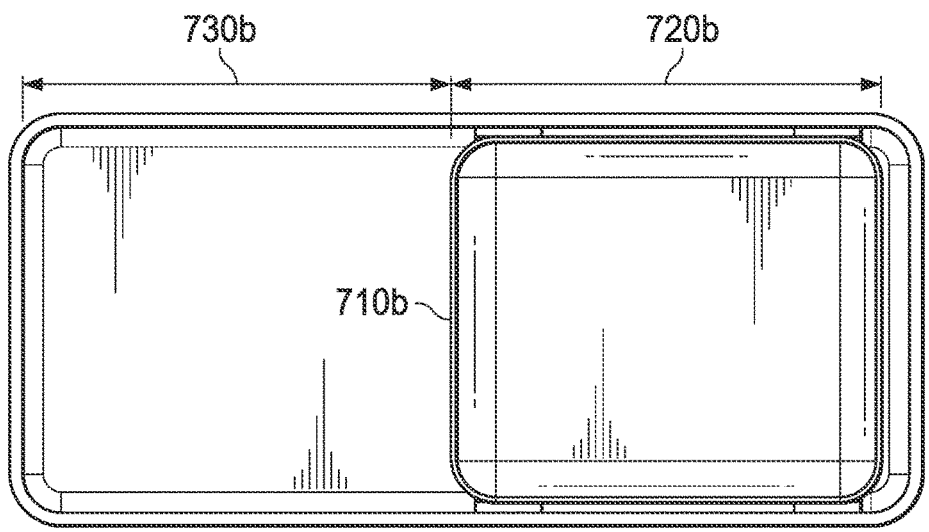
Figure 7C:
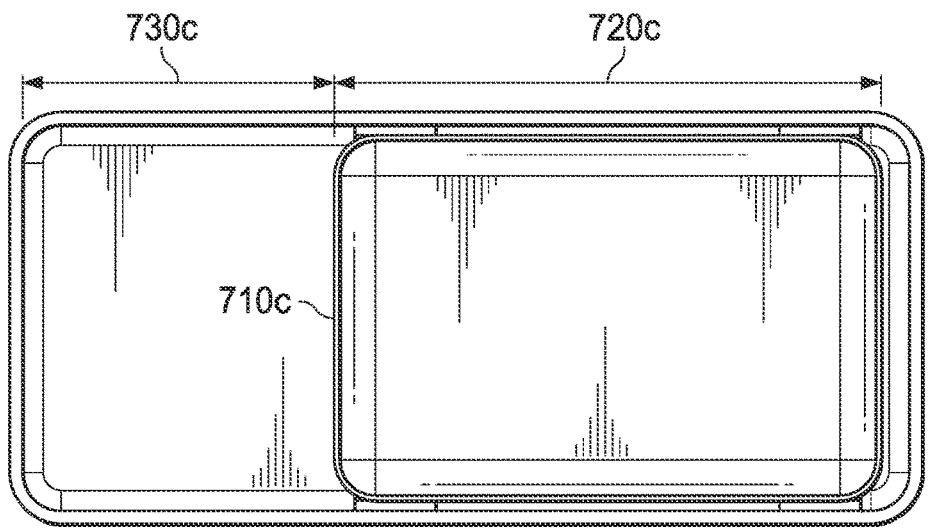

FIGS. 7a, 7b, and 7c are top views of a delivery container with drawers of different sizes, according to some embodiments of the present disclosure. In some embodiments, the drawer 610 may have an adjustable size, e.g., the drawer can extend or contract depending on the size of the load to be placed on the drawer. Alternatively, the drawer 610 may be removeable and replaceable with a drawer of a different size. For example, if the delivery container is used to transport two loads of different sizes, the second load for delivery is placed on a drawer sized to fit the second load, and the first load for delivery is placed in the remaining space in front of the drawer.

FIG. 7a illustrates a first drawer 710a having a first drawer length 720a. The first drawer length 720a leaves a first remaining compartment length 730a, where the drawer length 720a is smaller than the remaining compartment length 730a. This configuration can be used if the size of the load placed on the drawer 710a is smaller than the size of the load placed in the remaining compartment 730a.

FIG. 7b illustrates a second drawer 710b having a second drawer length 720b. The second drawer length 720b leaves a second remaining compartment length 730b, where the drawer length 720b is roughly equal to the remaining compartment length 730b. This configuration can be used if the size of the load placed on the drawer 710b is around the same as the size of the load placed in the remaining compartment 730b; this may also be a default or typical configuration.

FIG. 7c illustrates a third drawer 710c having a third drawer length 720c. The third drawer length 720c leaves a second remaining compartment length 730c, where the drawer length 720c is greater than the remaining compartment length 730c. This configuration can be used if the size of the load placed on the drawer 710c is larger than the size of the load placed in the remaining compartment 730c.

Figure 8:
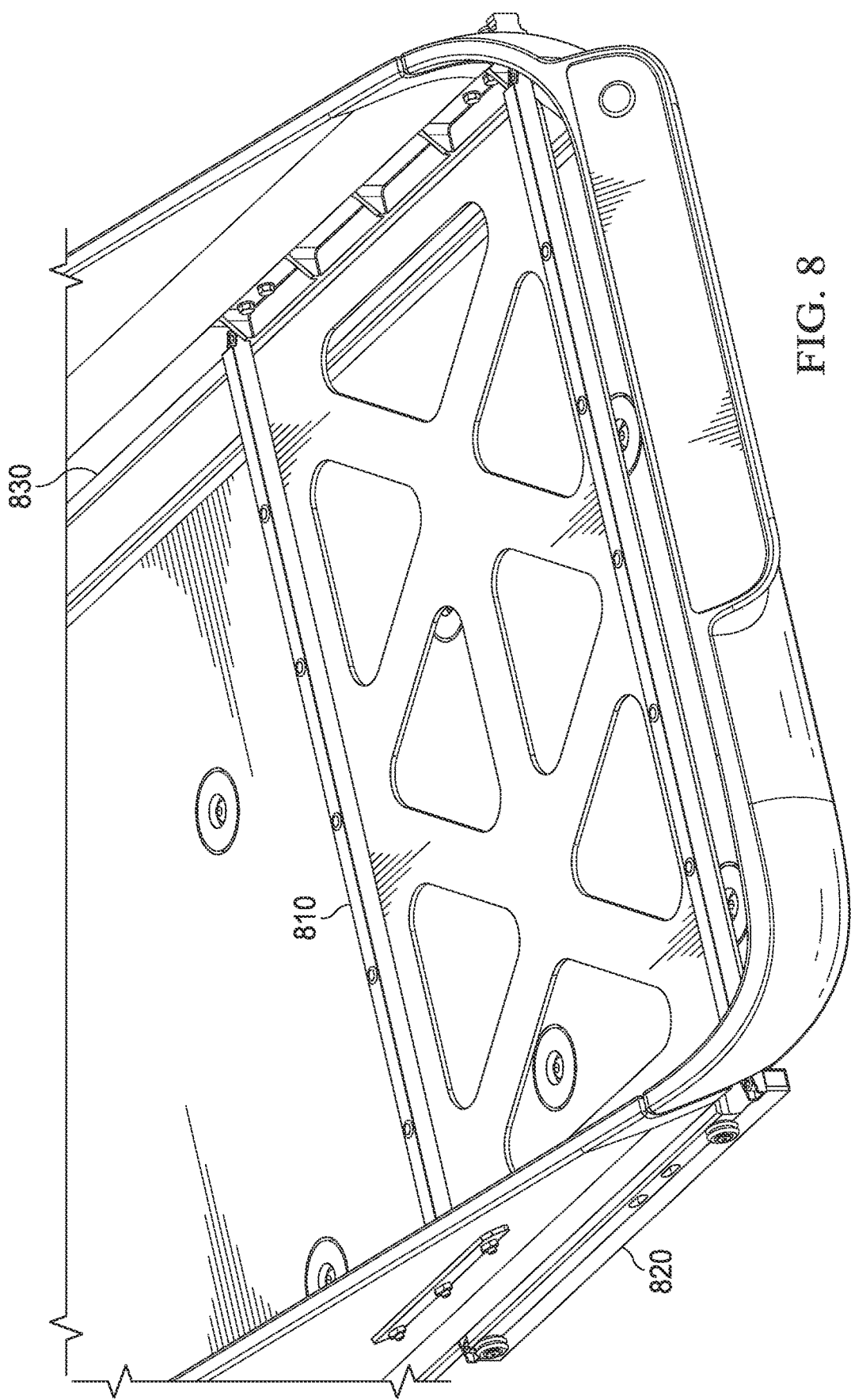
FIG. 8 is a detail view of a drawer base mounted on a track, according to some embodiments of the present disclosure.

FIG. 8 is a detail view of a drawer base mounted on a track, according to some embodiments of the present disclosure. As shown in FIG. 8, the drawer (e.g., the drawer 610) has a drawer base 810 with a track connection 820 that connects to a track 830 along the side of the delivery container. The drawer base 810 may be formed of metal or rigid plastic. The track connection 820 may have a sliding mechanism, such as one or more wheels, to slide the drawer base 810 back and forth along the track. The leadscrew described above may couple to the track connection 820 to automatically move the drawer base 810. A drawer liner and a drip tray, as shown in FIG. 5, may be installed over the drawer base 810 of FIG. 8.

Figure 9A:
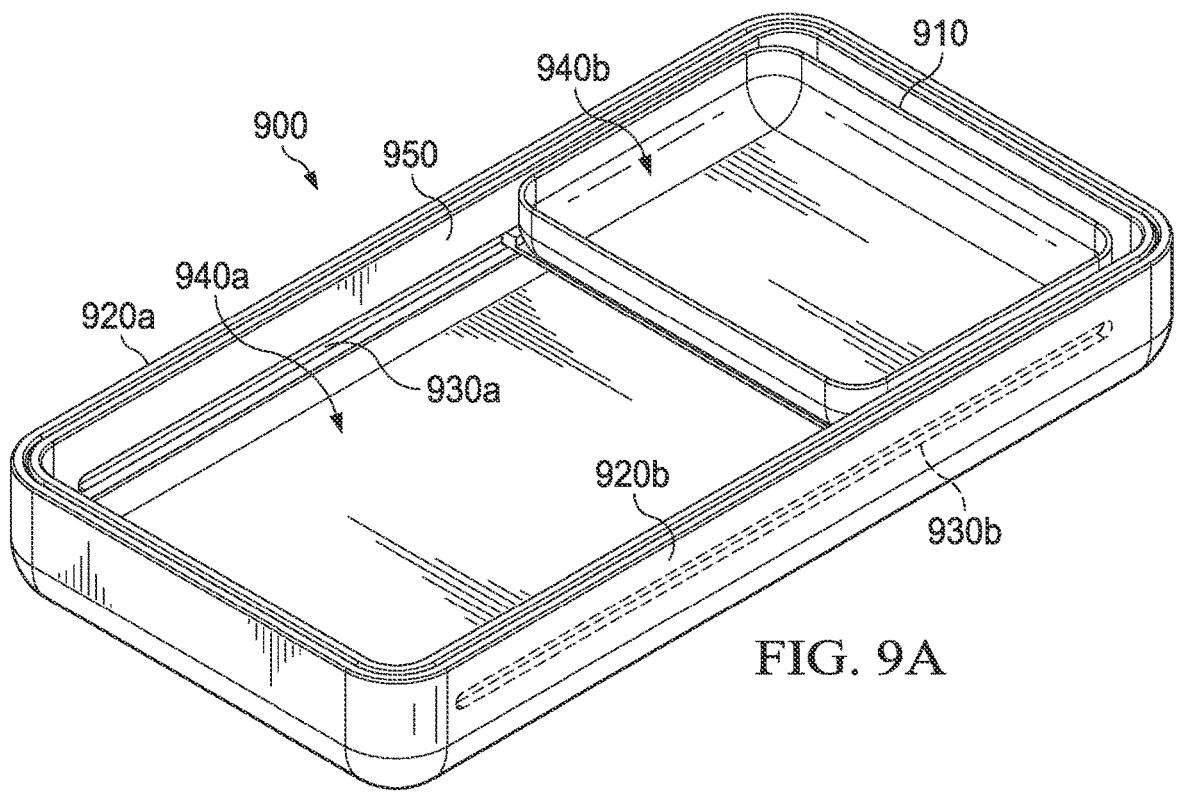
FIGS. 9a and 9b are perspective views of a delivery container with a slider ring for moving a drawer along a track, according to some embodiments of the present disclosure.
Figure 9B:
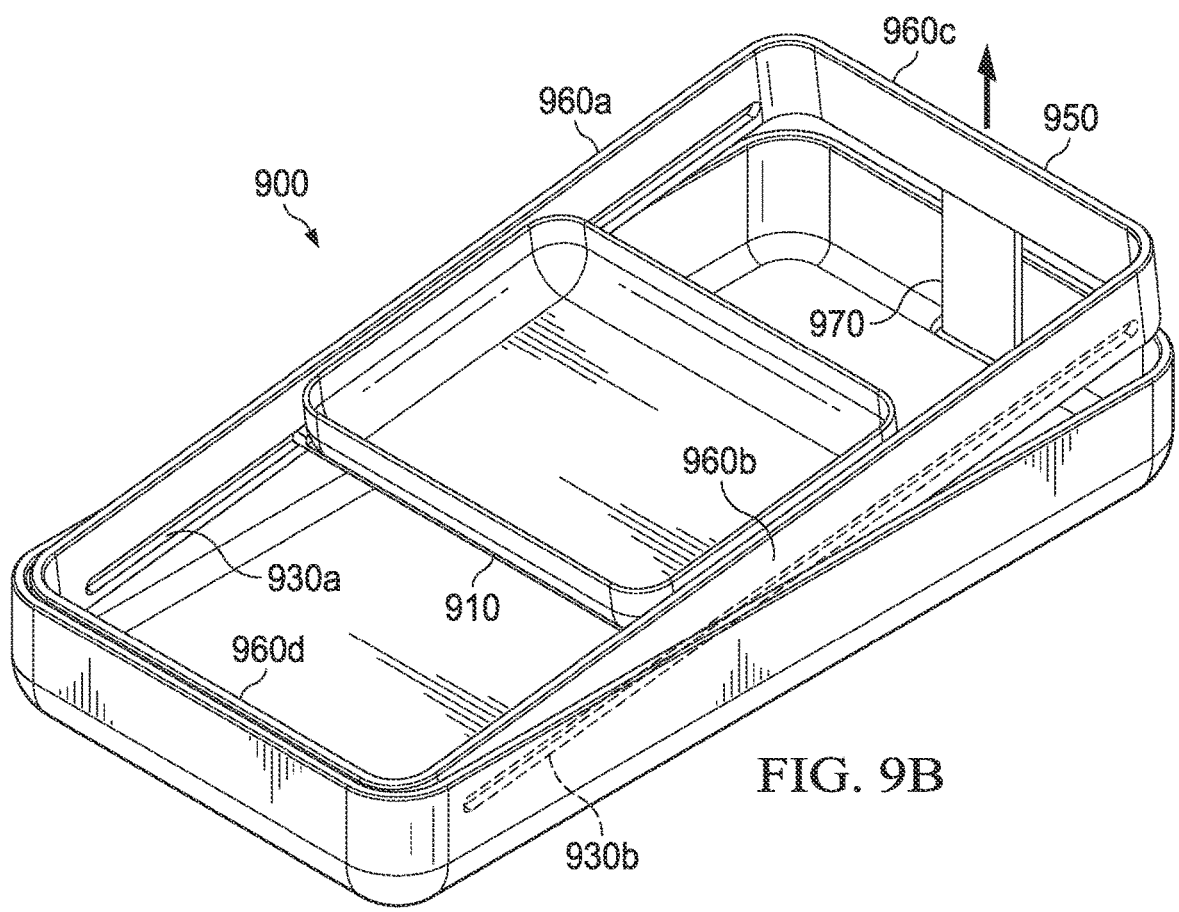

FIGS. 9a and 9b provide two perspective views of a delivery container with a slider ring for moving a drawer along a track, according to some embodiments of the present disclosure. The slider ring 950 provides an alternate sliding mechanism to the leadscrew described with respect to FIGS. 6 and 8. In FIG. 9a, a delivery container 900 includes a drawer 910 positioned within the delivery container 900 and along a pair of tracks 930a and 930b. The delivery container 900 includes a first side 920a and a second side 920b, which are two long sides on opposite sides of the delivery container 900. The delivery container 900 also has two short sides, similar to the short sides described with respect to FIG. 6a. While the sides are depicted as having a uniform height, the drawer 910, tracks 930, and slider ring 950 may be incorporated into any design of delivery container, such as the delivery containers 100 or 300 described above.

The delivery container 900 may have two compartments or regions 940a and 940b, similar to the two regions 640a and 640b. The tracks 930 enables the drawer 910 to move from the second region 940b, where it is shown in FIG. 9a, to the first region 940a. Thus, the drawer 910 can move from a position proximate to the left vehicle door to a position proximate to the right vehicle door.

In this example, the movement of the drawer 910 along the tracks 930a and 930b is controlled by a slider ring 950. The slider ring 950 has at least three sides 960a, 960b, and 960c, shown in FIG. 9b. A first side 960a sits inside the first side 920a of the delivery container 900, and a second side 960b sits inside the second side 920b of the delivery container 900. A first track 930a is mounted to the first side 960a of the slider ring 950 and extends along at least a portion of the first side 960a. A second track 930b is mounted to the second side 960b of the slider ring 950 and extends along at least a portion of the second side 960b. The lengths of the tracks 930 enable to the drawer 610 to move across the full length of the delivery container 600.

A third side 960c extends between the first side 960a and the second side 960b and is proximate to one of the short sides of the delivery container 900. The slider ring 950 is controlled by a linear actuator. In particular, a linear actuator underneath the third side 960c can lift up the third side 960c of the slider ring, and gravity pulls the drawer 910 towards the side of the delivery container opposite the linear actuator, as illustrated in FIG. 9b. After the drawer 910 has moved from one side of the delivery container to the other (e.g., from the second region 940b to the first region 940a), the linear actuator may drop the slider ring 950 back down into the delivery container 900, to the position of the slider ring 950 shown in FIG. 9a. The linear actuator may drop the slider ring back down after a set time after which the drawer 910 is expected to have moved to the opposite side. Alternatively, the delivery container 900 may include a sensor to detect whether the drawer 910 has reached the opposite side of the delivery container.

In some embodiments, the slider ring 950 includes a fourth side 960d. The delivery container 900 may further include a second linear actuator under the fourth side 960d to lift the fourth side 960d of the slider ring 950. The second linear actuator is similar to the linear actuator below the third side 960c. With the second linear actuator, the drawer 910 can also be automatically moved in the opposite direction, i.e., from the first region 940a to the second region 940b.

As with the drawer 610 shown in FIG. 6, the drawer 910 may alternately be moved manually. The delivery container 900 may have a sensor to detect whether the drawer 910 has been manually engaged, and if so, the delivery container 900 not activate the linear actuator. In some cases, if the linear actuator is engaged with an end of the slider ring lifted up, a user may also manually pull the drawer 910 forward (e.g., to move the drawer 910 faster).

The drawer 910 may have an adjustable size, or the drawer may be removeable and replaceable with a differently sized drawer, as described with respect to FIGS. 7a-7c. The drawer 910 may have a metal base and with a drawer liner and drip tray over top, as described with respect to FIG. 8.

While the examples shown in FIGS. 6-9 include a single drawer, in other embodiments, two or more drawers may be included, e.g., to store three or more separate loads of groceries. For example, two drawers at different heights may be included, where the lower drawer stores the second load of items to be delivered, and the higher drawer stores the third load of items to be delivered. The higher drawer can be positioned over the lower drawer for the third delivery.

Example Delivery Container Dividers

As noted above, the delivery container may have a divider to separate portions or compartments of the container. This enables a single delivery container to hold multiple loads for different recipients. Three example dividers are shown in FIGS. 10-12. The divider may be used in combination with a drawer, such as the drawers described in relation to FIGS. 6-9, for sliding a delivery load from one side of the container to the other side.

Figure 10A:
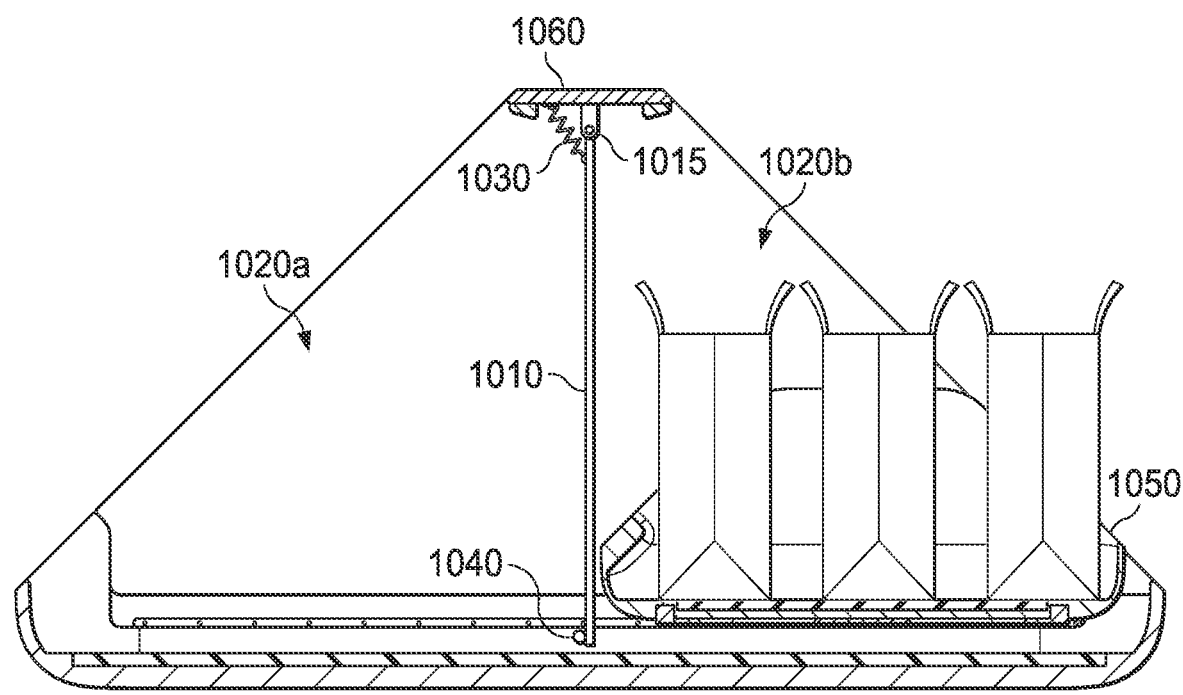
FIGS. 10a and 10b show side cutaway views of a hinged top-mounted divider in two positions, according to some embodiments of the present disclosure.
Figure 10B:
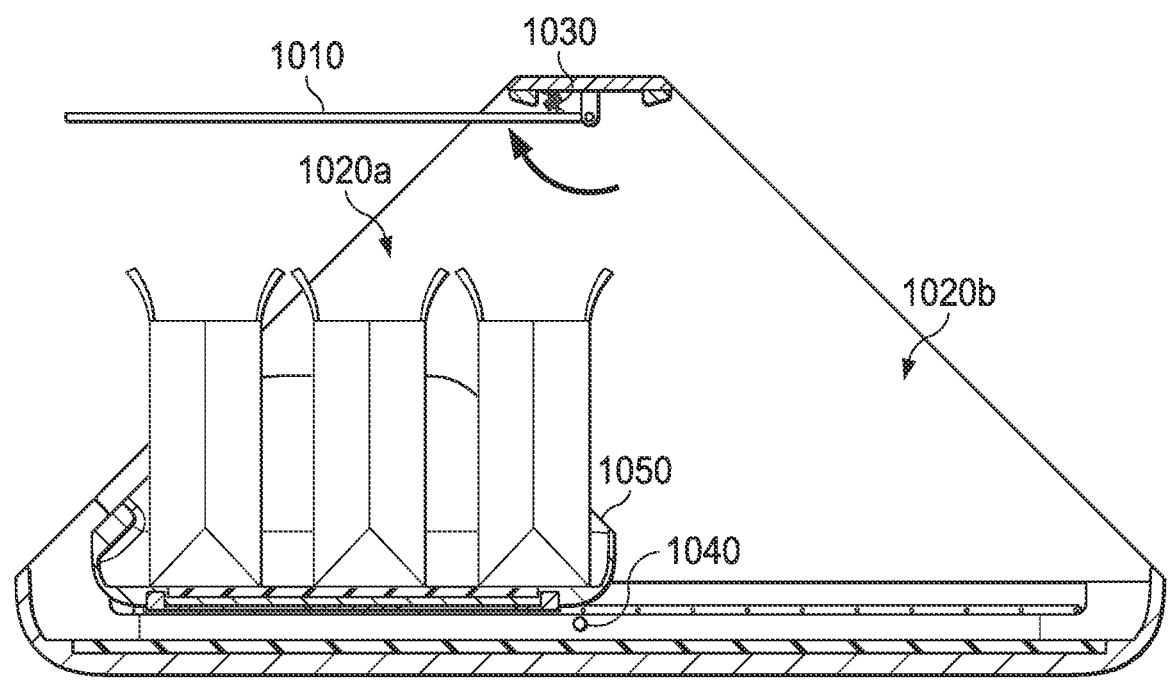

FIGS. 10a and 10b show side cutaway views of a hinged top-mounted divider 1010 in two positions, according to some embodiments of the present disclosure. The divider 1010 is attached to the top 1060 of the delivery container, e.g., at a hinged joint 1015 connecting the divider 1010 to the top 1060. The divider 1010 may be made of plastic, metal, fabric supported by a metal wire around its edge, or another material. The divider 1010 may be load bearing (e.g., so that items may lean against the divider 1010) or non-load bearing. If the divider 1010 is not load bearing, a person loading the items for delivery may be advised not to rest or lean delivery items against the divider 1010, e.g., by instructions printed on the divider 1010.

FIG. 10a shows the divider 1010 in a first position, where the divider 1010 separates a first region 1020a from a second region 1020b. The divider 1010 is spring-loaded, with a spring 1030 coupling the divider 1010 to the top 1060 of the delivery container near the joint 1015. While in the first position, the divider 1010 is held vertically in place at or near the base of the container by a latch 1040. The delivery container may include one latch 1040 near the bottom of one of the long sides of the delivery container, or two latches, one on each of the long sides of the delivery container. The latch 1040 or latches may be controlled by an electronic controller. In some cases, the latch 1040 may be controlled by a user, e.g., in response to a user pressing a button on the UI panel 180 or 380. When the latch 1040 is actuated (e.g., retracted to no longer exert force on the divider), the spring 1030 causes the divider 1010 to swing upwards to a second position, as shown in FIG. 10b. When the divider 1010 is in the second position, a delivery load on the drawer 1050 in the second region 1020b can move to the other side of the divider 1010 and into the first region 1020a, as illustrated in FIG. 10b.

Figure 11A:
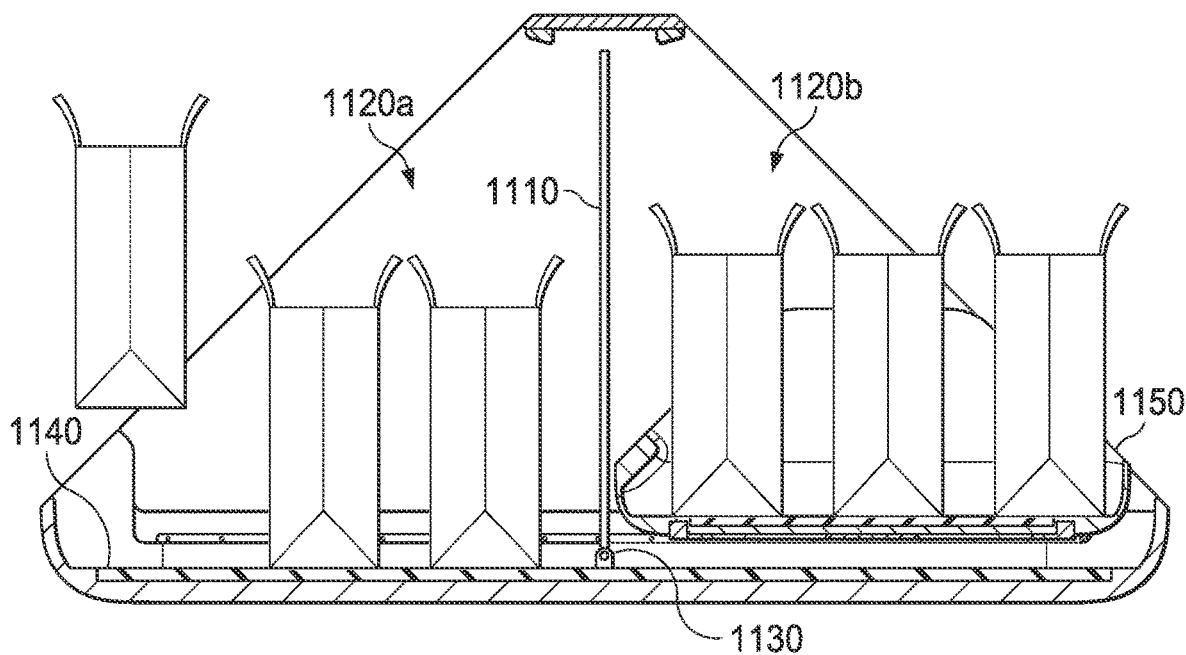
FIGS. 11a and 11b show side cutaway views of a hinged bottom-mounted divider in two positions, according to some embodiments of the present disclosure.
Figure 11B:
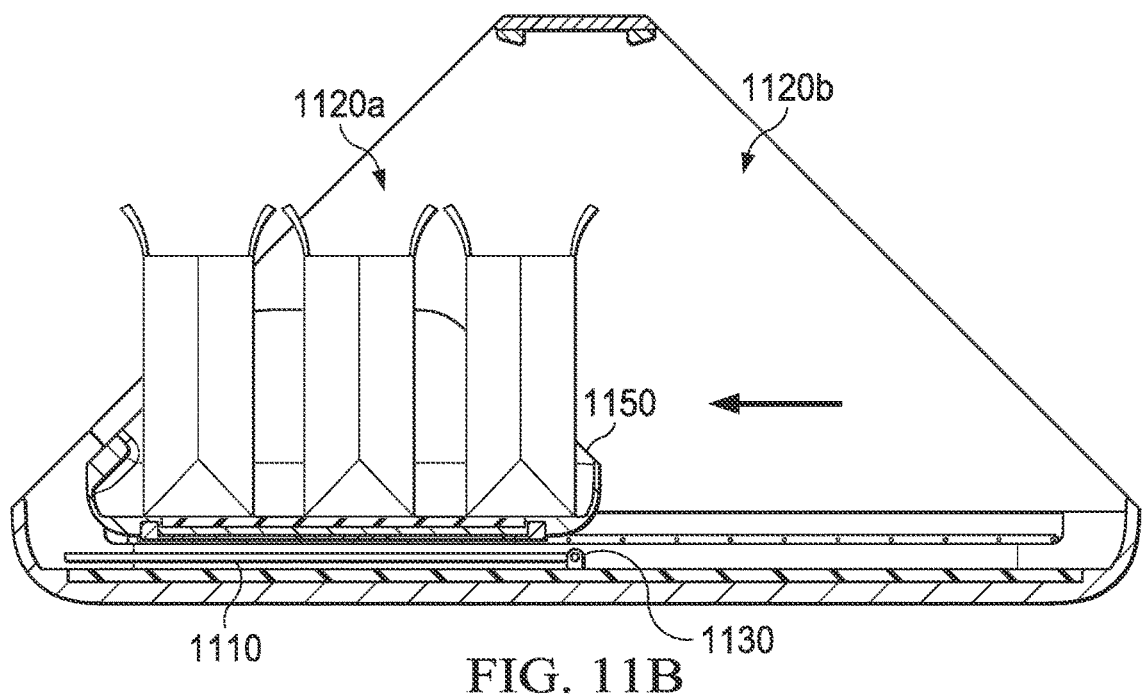

FIGS. 11a and 11b show side cutaway views of a hinged bottom-mounted divider 1110 in two positions, according to some embodiments of the present disclosure. In this example, the divider 1110 is attached to the base 1140 of the delivery container at a hinge 1130. In the first position shown in FIG. 11a, the divider 1110 separates a first region 1120a from a second region 1120b.

The divider 1110 may be made of plastic, metal, fabric supported by a metal wire around its edge, or another material. The divider 1110 may be load bearing (e.g., so that items may lean against the divider 1110) or non-load bearing. In some embodiments, the delivery container includes a latch or other mechanism along the top of the container or near the top of one or both of the long sides to hold the divider 1110 in its upright position. The hinge 1130 enables the divider 1110 to swing downward so that it lays flat over the base of the delivery container, as illustrated in FIG. 11b. The hinge 1130 may be actuated by an electronic controller. In some cases, the hinge 1130 may be controlled by a user, e.g., in response to a user pressing a button on the UI panel 180 or 380, or the user pulling down the divider 1110. When the divider 1110 is in the second position, a delivery load on the drawer 1150 in the second region 1120b can move into the first region 1120a over top of the divider 1110, as illustrated in FIG. 10b.

Figure 12A:
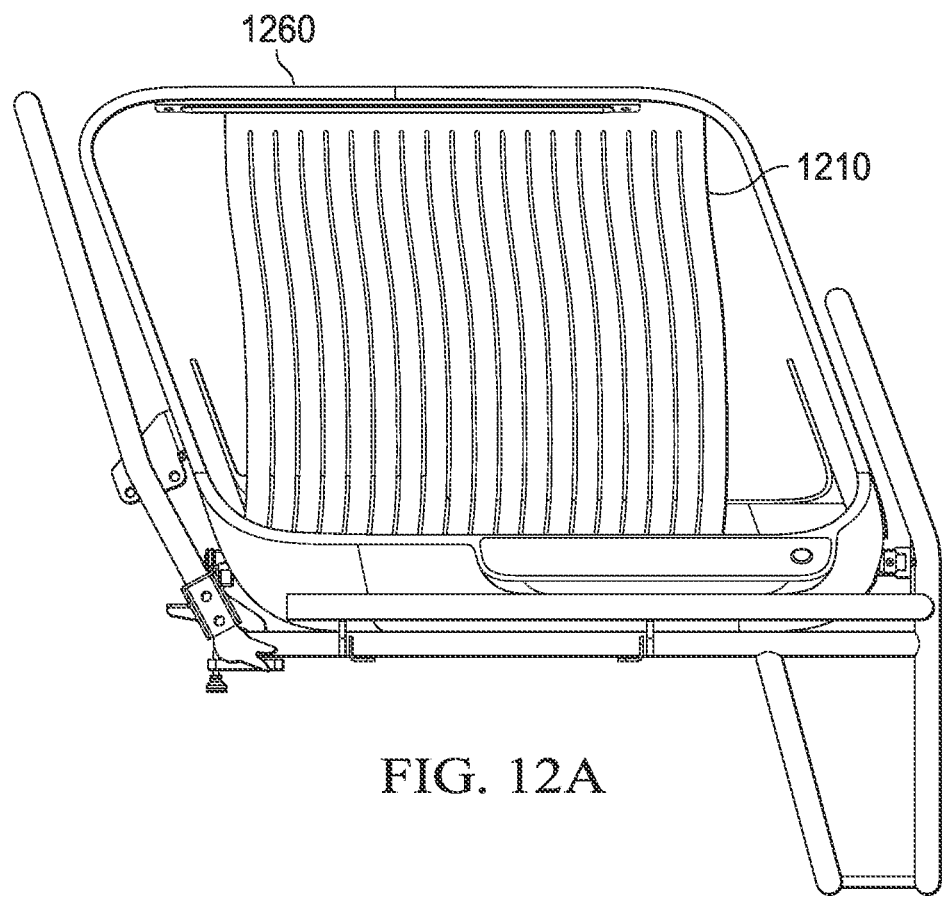
FIGS. 12a and 12b show front and side cutaway views of a curtain divider, according to some embodiments of the present disclosure.
Figure 12B:
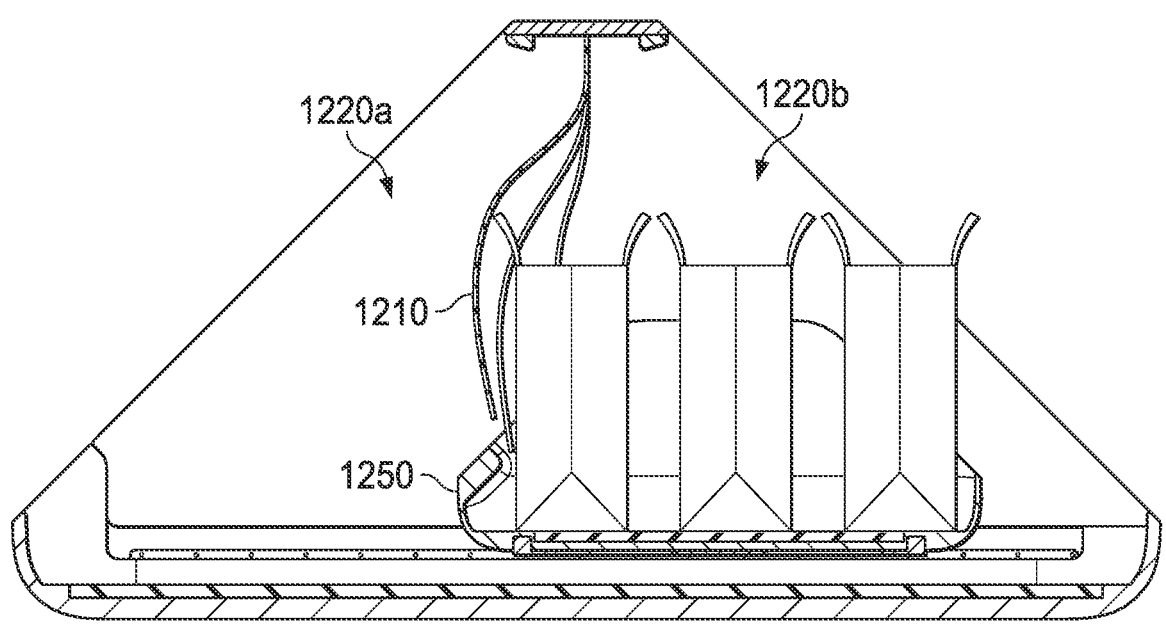

FIGS. 12a and 12b show front and side cutaway views of a curtain divider 1210, according to some embodiments of the present disclosure. In this example, the divider 1210 is flexible curtain, such as a piece of fabric or flexible plastic, that hangs down from the top 1260 of the delivery container. Rather than moving the divider 1210 out of the way prior to moving the delivery items from one side of the delivery container to the other, as shown in FIGS. 10 and 11, the flexible curtain passively allows delivery items to pass from one side of the divider 1210 to the other. For example, as shown in FIG. 12b, a delivery load moving from the second compartment 1220b to the first compartment 1220a on a drawer 1250 can push the curtain divider 1210 up and out of the way, as illustrated by the multiple positions of the divider 1210 in FIG. 12b. The divider 1210 is not load bearing. The divider 1210 is not controlled by an actuator, which may make the divider 1210 simpler and less expensive than the dividers 1010 or 1110.

While each of the divider embodiments shown in FIGS. 10-12 include a single divider 1010, 1110, or 1210 for separating the delivery container into two compartments, it should be understood that in other embodiments, two or more dividers may be included to separate the delivery container into three or more compartments. Furthermore, in some embodiments, the divider or dividers do not divide the container into equally sized compartments, but may instead create compartments of different sizes. In some embodiments, a divider may be moveable to create differently sized compartments, e.g., the divider 1210 shown in FIG. 12 may be attached to a set of rails along the top of the container, and the divider 1210 may be moved along the rail to change the sizes of the compartments.

Example Unloading Sequence

Figure 13A:
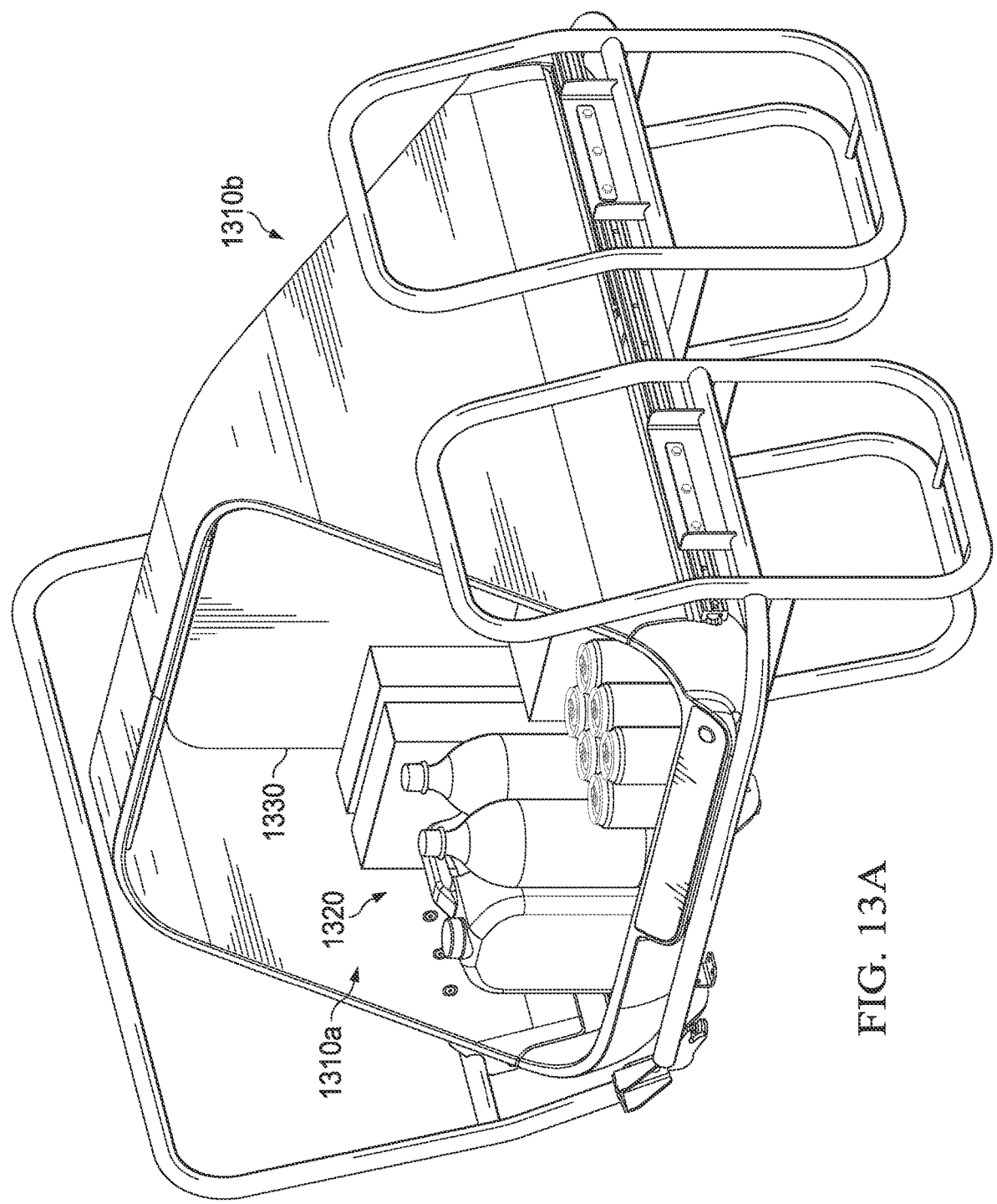
FIGS. 13a-13e illustrate a sequence of unloading groceries from two sides of a delivery container, according to some embodiments of the present disclosure.

FIGS. 13a-13e illustrate an unloading sequence for an example delivery container. FIG. 13a shows a delivery container with a visible load of groceries 1320 in a first region 1310a of the delivery container. The first region 1310a is separated from a second region 1310b by a divider 1330, e.g., any of the dividers described with respect to FIGS. 10-12. The visible load of groceries may be a first delivery load positioned on the right side of an AV for a first recipient to access.

Figure 13B:
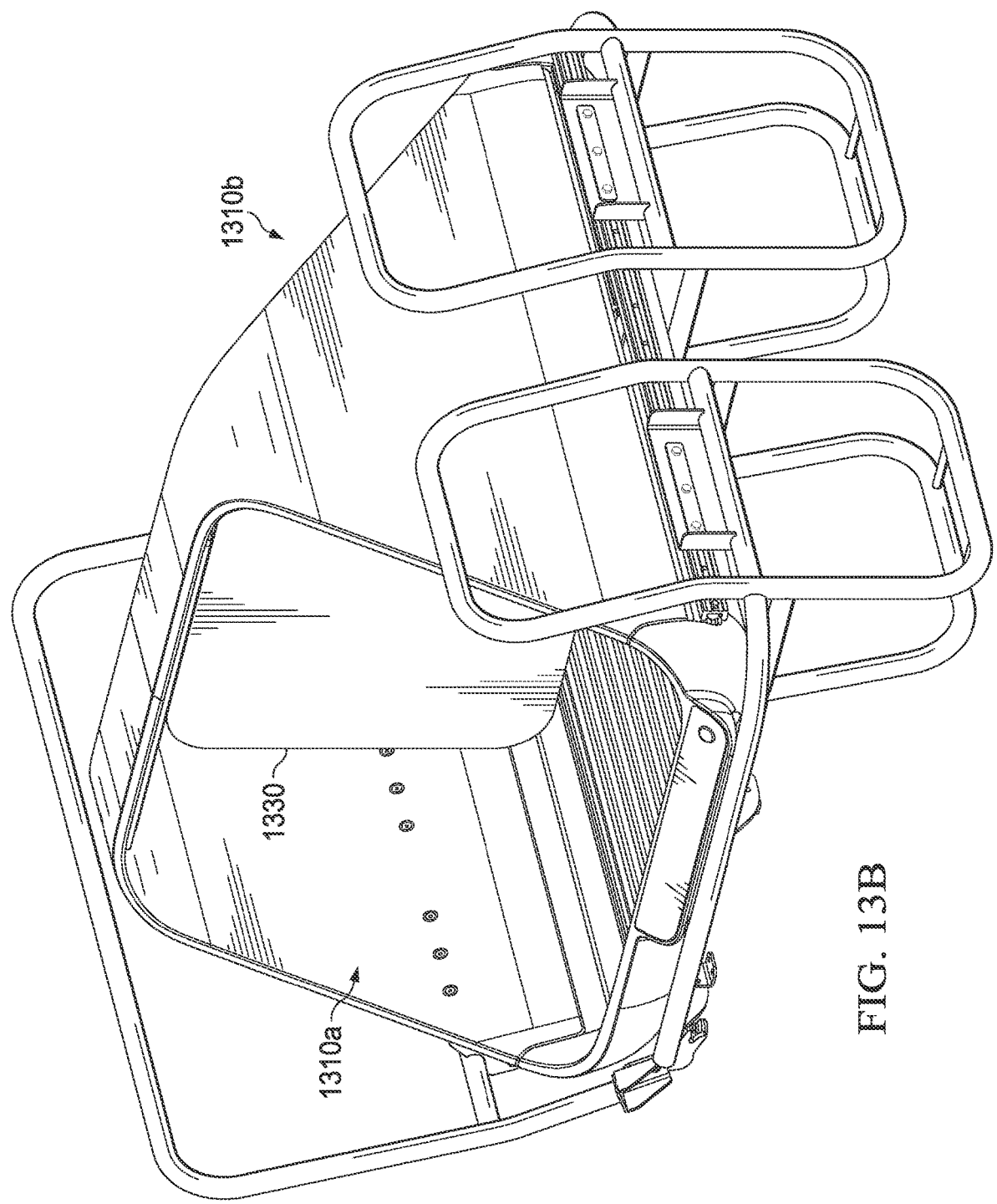

FIG. 13b shows the delivery container with the first load of groceries 1320 removed from the first region 1310a. The divider 1330 and base of the delivery container are more fully visible.

Figure 13C:
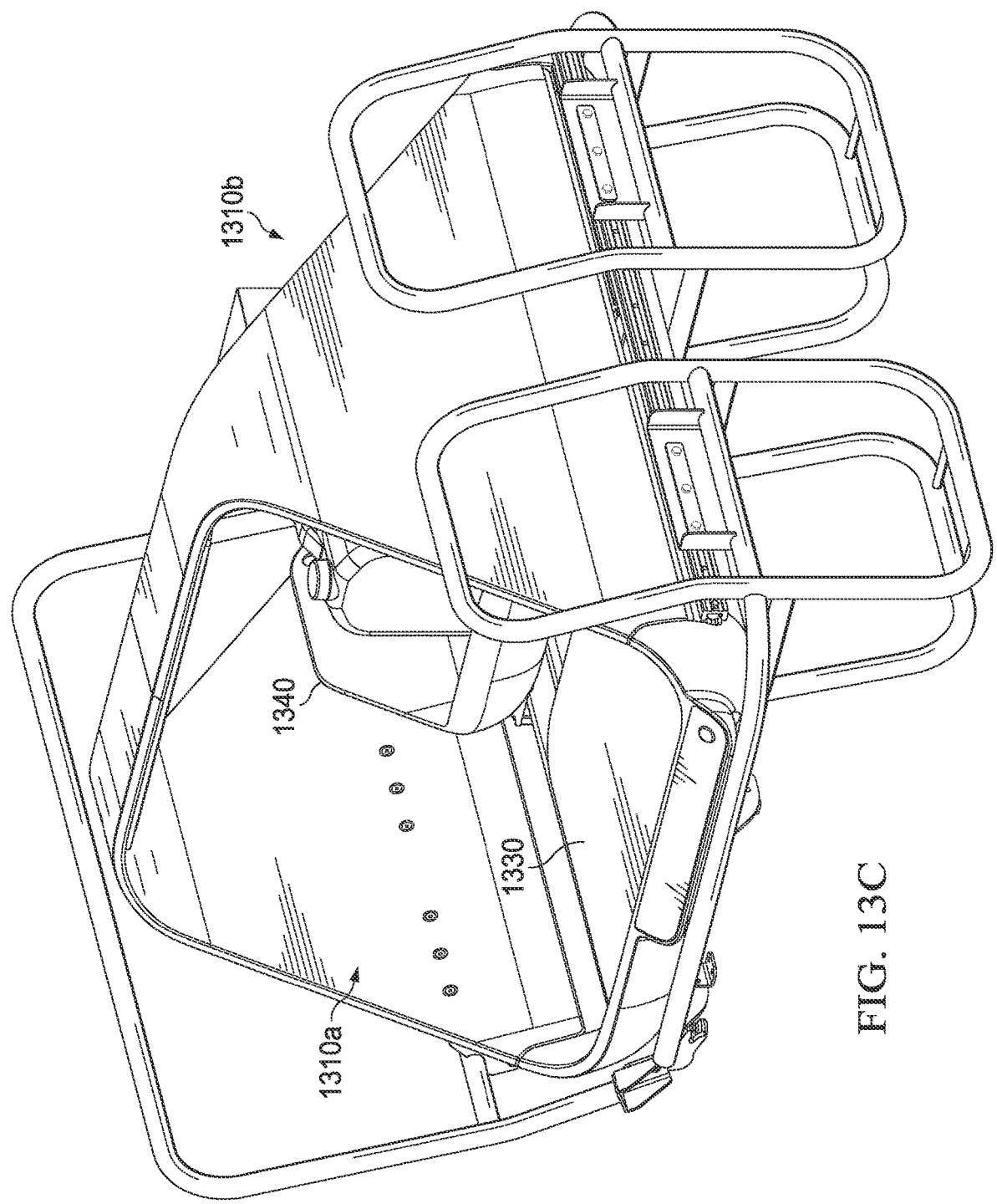

FIG. 13c shows the delivery container after the divider 1330 has been swung downward, over the base of the delivery container, as described with respect to FIG. 11b. A drawer 1340 with a second delivery load for a second recipient, or a second portion of the first recipient's delivery load, is visible in the second region 1310b.

Figure 13D:
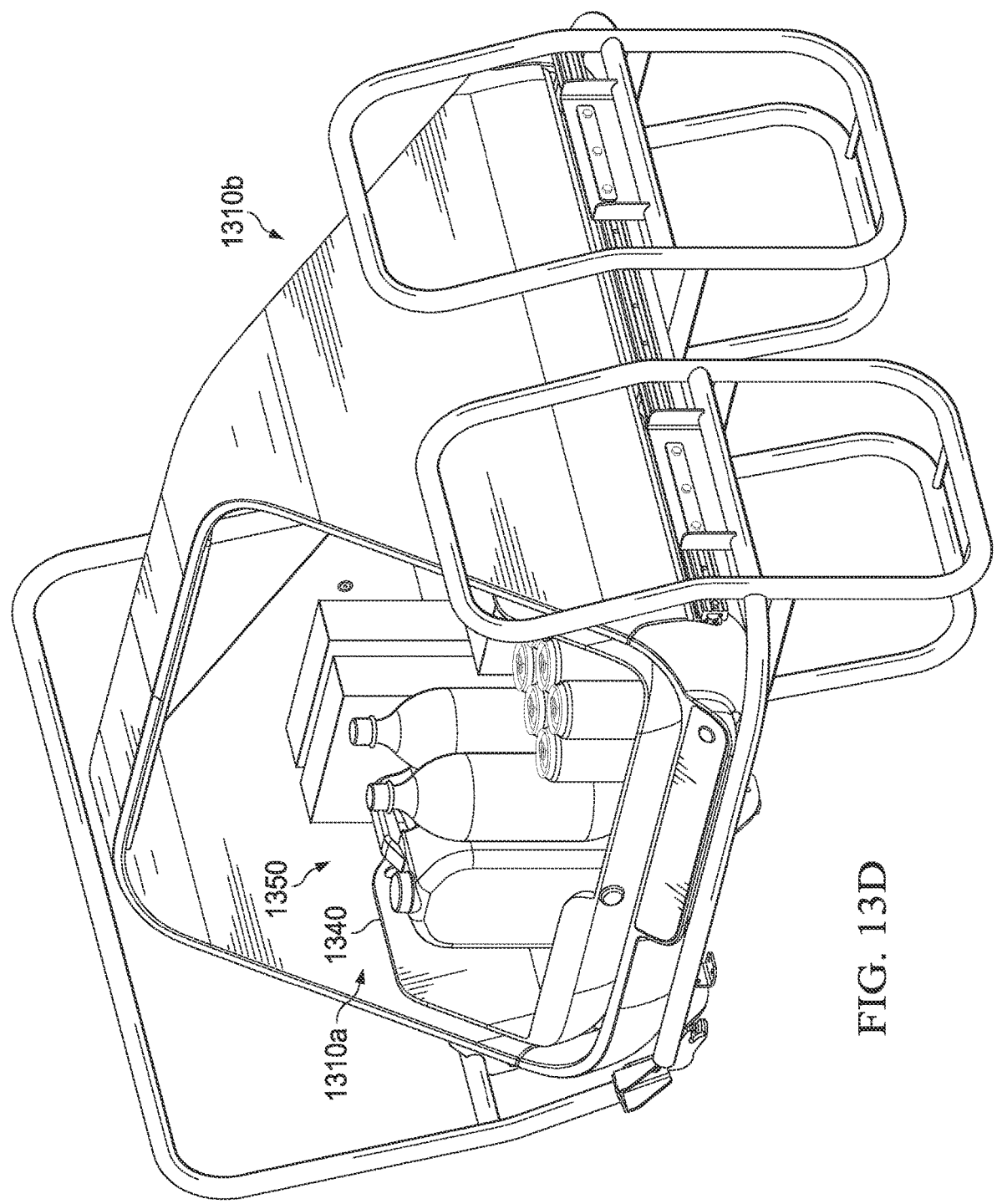
Figure 13E:
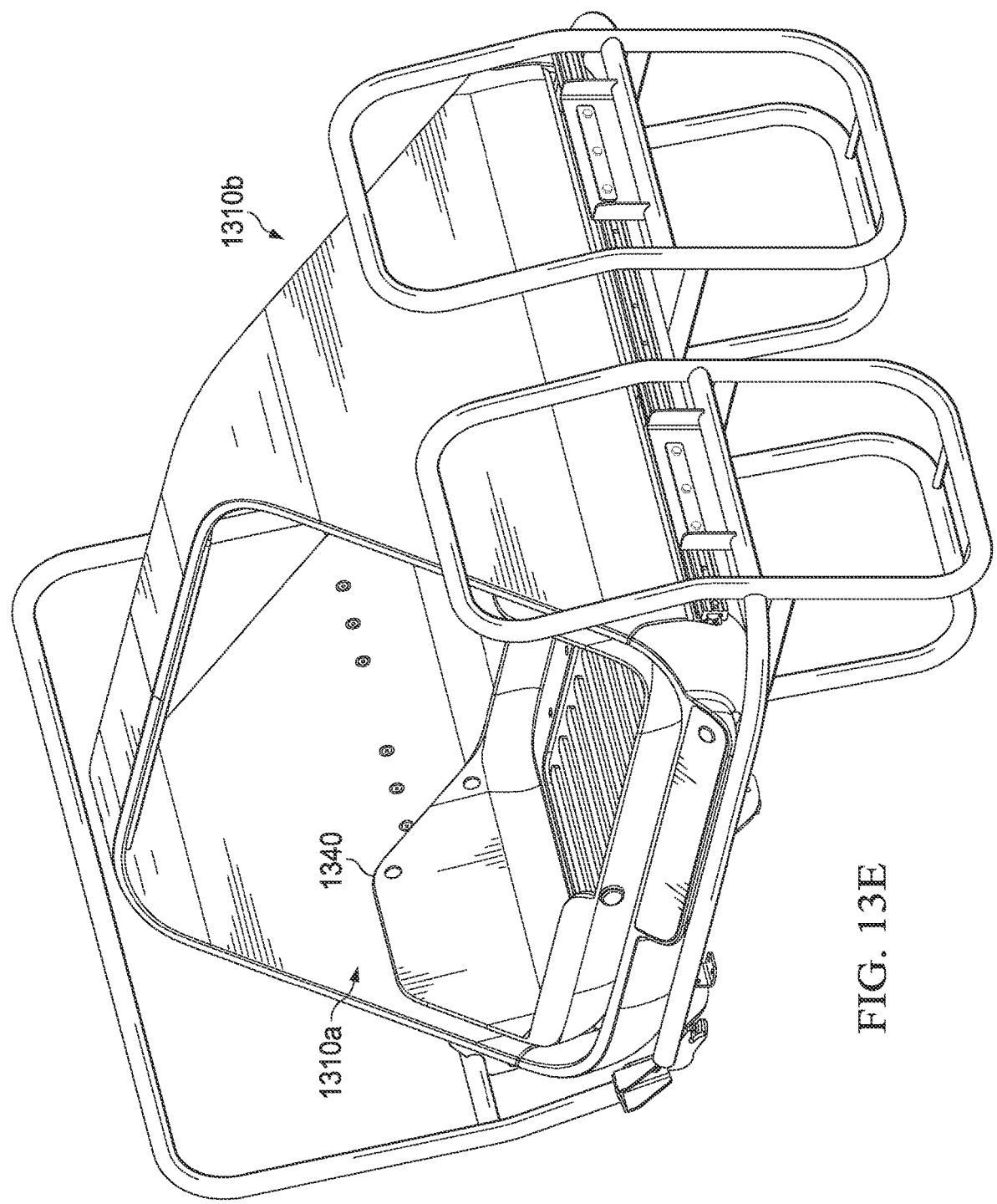

In FIG. 13d, the drawer 1340 has moved from the second region 1310b to the first region 1310a. The drawer may have moved along set of tracks, e.g., the tracks 630 or 930, as described with respect to FIG. 6 or 9. A second load of groceries 1350 is visible on the drawer 1340 and in the first region 1310a. FIG. 13e, the second load of groceries 1350 has been removed from the drawer 1340.

Select Examples

Example 1 provides a delivery system including a delivery container having a first side, a second side opposite the first side, a third side extending between the first side and the second side, and a fourth side opposite the third side and extending between the first side and the second side, the third side accessible from a left vehicle door, and the fourth side accessible from a right vehicle door; a first track extending along at least a portion of the first side; a second track extending along at least a portion of the second side; and a moveable drawer coupled to the first track and the second track, the moveable drawer to move from a first region of the delivery container proximate to the left vehicle door to a second region of the delivery container proximate to the right vehicle door.

Example 2 provides the delivery system of example 1, where the first region of the delivery container is bounded by the third side, a first portion of the first side, and a first portion of the second side; and the second region of the delivery container is bounded by the fourth side, a second portion of the first side, and a second portion of the second side.

Example 3 provides the delivery system of example 1, further including a leadscrew coupled to the first track, the leadscrew to automatically move the drawer along the first track and the second track.

Example 4 provides the delivery system of example 3, further including a controller to determine that one or more items in the second region of the delivery container have been removed from the delivery container; and in response, actuate the leadscrew to move the drawer along the first track and the second track from the first region of the delivery container to the second region of the delivery container.

Example 5 provides the delivery system of example 3, further including a clutch coupled to the leadscrew, the clutch to disengage the leadscrew in response to manual movement of the drawer.

Example 6 provides the delivery system of example 1, where the first track and the second track are coupled to a slider ring positioned within the first side, the second side, the third side, and the fourth side of the delivery container, the slider ring having a first side, where the first track extends along the first side of the slider ring; a second side, where the second track extends along the second side of the slider ring; and a third side proximate to the third side of the delivery container; where the delivery system further includes an actuator to lift the third side of the slider ring to move the drawer along the first track and the second track.

Example 7 provides the delivery system of example 6, further including a second actuator to lift a fourth side of the slider ring to move the drawer along the first track and the second track, the fourth side of the slider ring proximate to the fourth side of the delivery container.

Example 8 provides the delivery system of example 1, further including a divider to separate the first region of the delivery container from the second region of the delivery container.

Example 9 provides the delivery system of example 8, where the divider separates the first region of the delivery container from the second region of the delivery container in a first configuration, and the divider has a second configuration in which the divider does not separate the first region of the delivery container from the second region of the delivery container.

Example 10 provides the delivery system of example 8, where the divider includes a flexible material, and the drawer can move under the divider from the first region of the delivery container to the second region of the delivery container to move items from the first region of the delivery container to the second region of the delivery container.

Example 11 provides the delivery system of example 1, the delivery container further including a base; the delivery system further including a first drip tray over the base, the first drip tray having ridges separated by grooves; and a second drip tray over the drawer, the second drip tray having ridges separated by grooves.

Example 12 provides delivery system including a delivery container having a base; a first side; a second side opposite the first side; a third side extending between the first side and the second side; a fourth side opposite the third side and extending between the first side and the second side; a top extending between the first side and the second side; a first region bounded by a first portion of the base, a first portion of the first side, a first portion of the second side, and the third side; and a second region bounded by a second portion of the base, a second portion of the first side, a second portion of the second side, and the fourth side; the delivery system further including a first track extending along at least a portion of the first side; a second track extending along at least a portion of the second side; and a moveable drawer coupled to the first track and the second track, the moveable drawer to move from the first region of the delivery container to the second region of the delivery container.

Example 13 provides the delivery system of example 12, where the first side and the second side extend upward from the base, the first side and the second side each have a first width at a lower portion of the first side and the second side, respectively, and the first side and the second side each have a second width at an upper portion of the first side and the second side, respectively, the second width less than the first width.

Example 14 provides the delivery system of example 12, further including a leadscrew coupled to the first track, the leadscrew to automatically move the drawer along the first track and the second track.

Example 15 provides the delivery system of example 14, further including a clutch coupled to the leadscrew, the clutch to disengage the leadscrew in response to manual movement of the drawer.

Example 16 provides the delivery system of example 12, where the first track and the second track are coupled to a slider ring positioned within the delivery container, the slider ring having a first side, where the first track extends along the first side of the slider ring; a second side, where the second track extends along the second side of the slider ring; and a third side proximate to the third side of the delivery container; where the delivery system further includes an actuator to lift the third side of the slider ring to move the drawer along the first track and the second track.

Example 17 provides the delivery system of example 16, further including a second actuator to lift a fourth side of the slider ring to move the drawer along the first track and the second track, the fourth side of the slider ring proximate to the fourth side of the delivery container.

Example 18 provides the delivery system of example 12, further including a divider to separate the first region of the delivery container from the second region of the delivery container.

Example 19 provides a delivery system including a delivery container having a first region accessible from a left vehicle door, and a second region accessible from a right vehicle door; a first track extending across the first region and the second region; a second track extending across the first region and the second region, the second track on an opposite side of the delivery container from the first track; a drawer coupled to the first track and the second track; and a leadscrew coupled to the first track and the drawer, the leadscrew to automatically move the drawer along the first track and the second track from the first region of the delivery container to the second region of the delivery container.

Example 20 provides the delivery system of example 19, further including a clutch coupled to the leadscrew, the clutch to disengage the leadscrew in response to manual movement of the drawer along the first track and the second track.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A delivery system comprising:
   a delivery container comprising a first side, a second side opposite the first side, a third side extending between the first side and the second side, and a fourth side opposite the third side and extending between the first side and the second side, the third side accessible from a left vehicle door, and the fourth side accessible from a right vehicle door;
   a first track extending along at least a portion of the first side;
   a second track extending along at least a portion of the second side;
   a moveable drawer coupled to the first track and the second track, the moveable drawer to move from a first region of the delivery container proximate to the left vehicle door to a second region of the delivery container proximate to the right vehicle door;
   a leadscrew coupled to the first track, the leadscrew to automatically move the drawer along the first track and the second track; and
   a controller to:
      determine that one or more items in the second region of the delivery container have been removed from the delivery container, and
      in response, actuate the leadscrew to move the drawer along the first track and the second track from the first region of the delivery container to the second region of the delivery container.

2. The delivery system of claim 1, wherein the first region of the delivery container is bounded by the third side, a first portion of the first side, and a first portion of the second side;

and the second region of the delivery container is bounded by the fourth side, a second portion of the first side, and a second portion of the second side.

3. The delivery system of claim 1, further comprising a clutch coupled to the leadscrew, the clutch to disengage the leadscrew in response to manual movement of the drawer.

4. The delivery system of claim 1, wherein the first track and the second track are coupled to a slider ring positioned within the first side, the second side, the third side, and the fourth side of the delivery container, the slider ring comprising:
   a first side, wherein the first track extends along the first side of the slider ring;
   a second side, wherein the second track extends along the second side of the slider ring; and
   a third side proximate to the third side of the delivery container;
   wherein the delivery system further comprises an actuator to lift the third side of the slider ring to move the drawer along the first track and the second track.

5. The delivery system of claim 4, further comprising a second actuator to lift a fourth side of the slider ring to move the drawer along the first track and the second track, the fourth side of the slider ring proximate to the fourth side of the delivery container.

6. The delivery system of claim 1, further comprising a divider to separate the first region of the delivery container from the second region of the delivery container.

7. The delivery system of claim 6, wherein the divider separates the first region of the delivery container from the second region of the delivery container in a first configuration, and the divider has a second configuration in which the divider does not separate the first region of the delivery container from the second region of the delivery container.

8. The delivery system of claim 6, wherein the divider comprises a flexible material, and the drawer can move under the divider from the first region of the delivery container to the second region of the delivery container to move items from the first region of the delivery container to the second region of the delivery container.

9. The delivery system of claim 1, the delivery container further comprising a base; the delivery system further comprising:
   a first drip tray over the base, the first drip tray comprising ridges separated by grooves; and
   a second drip tray over the drawer, the second drip tray comprising ridges separated by grooves.

10. A delivery system comprising:
    a delivery container comprising:
      a base;
      a first side;
      a second side opposite the first side;
      a third side extending between the first side and the second side;
      a fourth side opposite the third side and extending between the first side and the second side;
      a top extending between the first side and the second side;
      a first region bounded by a first portion of the base, a first portion of the first side, a first portion of the second side, and the third side; and
      a second region bounded by a second portion of the base, a second portion of the first side, a second portion of the second side, and the fourth side;
    a first track extending along at least a portion of the first side;
    a second track extending along at least a portion of the second side;
    a moveable drawer coupled to the first track and the second track, the moveable drawer to move from the first region of the delivery container to the second region of the delivery container;
    a leadscrew coupled to the first track, the leadscrew to automatically move the drawer along the first track and the second track; and
    a clutch coupled to the leadscrew, the clutch to disengage the leadscrew in response to manual movement of the drawer.

11. The delivery system of claim 10, wherein the first side and the second side extend upward from the base, the first side and the second side each have a first width at a lower portion of the first side and the second side, respectively, and the first side and the second side each have a second width at an upper portion of the first side and the second side, respectively, the second width less than the first width.

12. The delivery system of claim 10, wherein the first track and the second track are coupled to a slider ring positioned within the delivery container, the slider ring comprising:
    a first side, wherein the first track extends along the first side of the slider ring;
    a second side, wherein the second track extends along the second side of the slider ring; and
    a third side proximate to the third side of the delivery container;
    wherein the delivery system further comprises an actuator to lift the third side of the slider ring to move the drawer along the first track and the second track.

13. The delivery system of claim 12, further comprising a second actuator to lift a fourth side of the slider ring to move the drawer along the first track and the second track, the fourth side of the slider ring proximate to the fourth side of the delivery container.

14. The delivery system of claim 10, further comprising a divider to separate the first region of the delivery container from the second region of the delivery container.

15. A delivery system comprising:
    a delivery container comprising a first region accessible from a left vehicle door, and a second region accessible from a right vehicle door;
    a first track extending across the first region and the second region;
    a second track extending across the first region and the second region, the second track on an opposite side of the delivery container from the first track;
    a drawer coupled to the first track and the second track; and
    a leadscrew coupled to the first track and the drawer, the leadscrew to automatically move the drawer along the first track and the second track from the first region of the delivery container to the second region of the delivery container.

16. The delivery system of claim 15, further comprising a clutch coupled to the leadscrew, the clutch to disengage the leadscrew in response to manual movement of the drawer along the first track and the second track.

* * * * *